(12) United States Patent
Cui et al.

(10) Patent No.: US 8,897,308 B2
(45) Date of Patent: Nov. 25, 2014

(54) NODE, A MONITORING MANAGEMENT METHOD USED FOR A NODE, AND A TRANSFER SYSTEM, AN INPUT CIRCUIT AND AN OUTPUT CIRCUIT

(75) Inventors: Zhenlong Cui, Tokyo (JP); Hiroyuki Takagi, Tokyo (JP); Masaki Umayabashi, Tokyo (JP); Kazuo Takagi, Tokyo (JP); Akira Sakurai, Tokyo (JP); Hiroshi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 304 days.

(21) Appl. No.: 13/505,546

(22) PCT Filed: Nov. 2, 2010

(86) PCT No.: PCT/JP2010/069878
§ 371 (c)(1),
(2), (4) Date: May 2, 2012

(87) PCT Pub. No.: WO2011/055837
PCT Pub. Date: May 12, 2011

(65) Prior Publication Data
US 2012/0219003 A1    Aug. 30, 2012

(30) Foreign Application Priority Data

Nov. 5, 2009  (JP) ................................. 2009-253569
Jun. 18, 2010  (JP) ................................. 2010-139696

(51) Int. Cl.
*H04L 12/26* (2006.01)
*H04L 12/723* (2013.01)

(52) U.S. Cl.
CPC ............... *H04L 12/26* (2013.01); *H04L 43/00* (2013.01); *H04L 45/50* (2013.01)
USPC .................... 370/395.5; 370/241.1; 370/236.2

(58) Field of Classification Search
CPC ......... H04L 12/26; H04L 12/04; H04L 12/56; H04L 28/48; H04L 41/0668; H04L 43/00; H04L 45/28; H04L 45/48; H04L 45/50
USPC ..................... 370/217–395.4, 395.5
See application file for complete search history.

(56) References Cited

U.S. PATENT DOCUMENTS

| 7,848,333 | B2 * | 12/2010 | Zhu et al. ....................... 370/397 |
| 2005/0147111 | A1 * | 7/2005 | Moleyar et al. ................ 370/412 |
| 2008/0112330 | A1 * | 5/2008 | He et al. ....................... 370/241.1 |
| 2008/0253299 | A1 * | 10/2008 | Damm et al. .................. 370/252 |
| 2010/0054132 | A1 | 3/2010 | Mitsumori |
| 2011/0058807 | A1 * | 3/2011 | Suzuki et al. ................... 398/23 |
| 2013/0155877 | A1 * | 6/2013 | Boutros et al. ................ 370/249 |

FOREIGN PATENT DOCUMENTS

| JP | 7-245617 A | 9/1995 |
| JP | 2010-056679 A | 3/2010 |

OTHER PUBLICATIONS

N. Bahadur, et al., "draft-nitinb-mpls-tp-lsp-ping-extensions-00,", LSP-Ping extensions for MPLS-TP, Internet Draft, Oct. 19, 2009, pp. 1-9.

N. Bahadur, et al., "draft-nitinb-mpls-tp-lsp-ping-bfd-procedures-02,", LSP-Ping and BFD encapsulation over ACH, Internet-Draft, Oct. 26, 2009, pp. 1-14.

N. Bahadur, et al., "draft-nitinb-mpls-tp-lsp-ping-bfd-procedures-00", http://tools.ietf.org/html/draft-nitinb-mpls-bfd-procedures-00, Jul. 5, 2009, pp. 1-15.

* cited by examiner

*Primary Examiner* — Afsar M Qureshi
(74) *Attorney, Agent, or Firm* — Sughrue Mion, PLLC

(57) ABSTRACT

A node according to the present invention is used in an MPLS (Multi Protocol Label Switching) network, and the node includes an input unit which receives an OAM (Operation Administration and Maintenance) frame including TTL (Time To Live) from outside of the node and an output unit which transmits an OAM frame to outside of the node, wherein the input unit sets the TTL to a specific value and transmits the received OAM frame to the output unit in case a termination destination which an OAM frame received from outside indicates is the node and the received OAM frame is to be transmitted to the output unit and the output unit terminates an OAM frame transmitted from the input unit.

25 Claims, 21 Drawing Sheets

| LABEL OF RECEIVED FRAME | HANDLING |
|---|---|
| α | x |
| β | y |
| γ | z |
| δ | TERMINATE |

NODE, A MONITORING MANAGEMENT METHOD USED FOR A NODE, AND A TRANSFER SYSTEM, AN INPUT CIRCUIT AND AN OUTPUT CIRCUIT

CROSS REFERENCE TO RELATED APPLICATIONS

This application is a National Stage of International Application No. PCT/JP2010/069878 filed Nov. 2, 2010, claiming priority based on Japanese Patent Application Nos. 2009-253569 filed Nov. 5, 2009 and 2010-139696 filed Jun. 18, 2010, the contents of all of which are incorporated herein by reference in their entirety.

TECHNICAL FIELD

The present invention relates to a node, a monitoring management method used for it, and a transfer system and an input circuit using it; and in particular, relates to a monitoring management technique in a packet network, and in more detail, to a confirmation technique of connection in a label switching network.

BACKGROUND ART

As a mechanism to transfer user traffic between edge devices within a carrier network, a label switching method using an MPLS (Multi-Protocol Label Switching) is generalized.

In the MPLS, each repeating device performs forwarding using an identifier which is attached to a packet and called a "label". A path in which a packet to which this label is attached passes is called an LSP (Label Switched Path).

When a packet arrives at an LER (label edge router) at an entrance of the LSP, a label is added to path information in the packet, and transferred to an LSR (label switching router). The LSR reads the label of the input packet, judges to which output port to transfer and transmits the packet. An LER at an exit of the network removes the label from the packet arrived and transfers it to outside of the network.

As a path diagnostic technique in an LSP installed between edge devices in a carrier network, for example, a technology described in the following non-patent literature 1 exists. As indicated in paragraph 4.2.1 and paragraph 4.2.2 of non-patent literature 1, the path diagnostic technique related to the present invention transfers an OAM (Operation Administration and Maintenance) packet to an LSP which performs path diagnosis, and by confirming its reply, examines disagreement of a label transfer destination path built based on a label switching method.

That is, OAM packets [tracing (trace) packet of a request] of which an upper limit of the number of transfer hops of the packet are different are transmitted successively, and in case there is no reply, it is judged that there is a defect in the communication.

For example, as shown in FIG. 21, a device 2a transmits OAM packets (for example, request message of LSP-trace) of which an upper limit of the number of transfer hops (TTL: Time to live) of the packet are different.

In case a repeating device which receives the OAM packet mentioned above is structured as a switch of a chassis type, at input line cards 21a, 21b and 21c of the repeating devices mentioned above (2a, 2b and 2c), a TTL value of the OAM packet mentioned above is made "TTL=TTL−1". In case result of this arithmetic operation is "0", the OAM packet mentioned above is terminated at the input line card.

Further, in case target (Target) ID (IDentifier) information in its TLV (Type/Length/Value) coincides with its own card ID information, a normal reply message is generated and returned to the devices (repeating devices 2a, 2b and 2c).

Referring to a format of an OAM frame shown in FIG. 22, the OAM frame includes: an LSP header [including LSP label, EXP (Experimental field), S (the stacking bit indicates) and TTL information], an identification header for identifying whether it is a control message such as OAM, TLV which becomes a payload of the frame and so on.

CITATION LIST

Non-Patent Literature

[Non-patent literature 1] N. Bahadur, R. Aggarwal, T. Nadeau, N. Sprecher, Y. Weingarten, IETF Draft "draft-nitinb-mpls-tp-lsp-ping-bfd-procedures-00", Jul. 5, 2009, http://tools.ietf.org/html/draft-nitinb-mpls-tp-lsp-ping-bfd-procedures-00.

SUMMARY OF INVENTION

Technical Problem

Because TTL arithmetic processing in the repeating device described in non-patent literature 1 is performed only in an input line card, an OAM frame of TTL=1 is terminated at the input line card of the repeating device mentioned above. In other words, in the technology related to the present invention, because there is a problem that an OAM packet is processed only in the input line card, and cannot be processed in the output line card, a trouble status of the output line card cannot be monitored.

Accordingly, the object of the present invention is to provide: a node, a monitoring management method used for it, and a transfer system, an input circuit and an output circuit using it which can solve the problem mentioned above and process the OAM frame in the output line card.

Solution to Problem

A first node according to the present invention is a node in an MPLS (Multi Protocol Label Switching) network, including: an input unit which receives an OAM (Operation Administration and Maintenance) frame including TTL (Time To Live) from outside of the node; and an output unit which transmits an OAM frame to outside of the node, wherein: the input unit sets the TTL to a specific value and transmits the received OAM frame to the output unit in case a termination destination which an OAM frame received from outside indicates is the node and the received OAM frame is to be transmitted to the output unit; and the output unit terminates an OAM frame transmitted from the input unit.

A second node according to the present invention is a node which transmits and receives an OAM (Operation Administration and Maintenance) frame including TTL (Time To Live), including: an input unit which receives an OAM frame from outside of a device; and an output unit which transmits an OAM frame to outside of a device, wherein the input unit sets TTL of an OAM frame received from outside to a specific value which shows that a termination destination is the output unit and transmits it to the output unit; and the output unit detects a value of TTL of an OAM frame received from the input unit and terminates an OAM frame including TTL of the specific value.

A monitoring management method according to the present invention is used for a node in an MPLS (Multi Protocol Label Switching) network, wherein the node includes an input unit which receives an OAM (Operation Administration and Maintenance) frame including TTL (Time To Live) from outside of the node and an output unit which transmits an OAM frame to outside of the node. The method includes setting the TTL to a specific value and transmitting the received OAM frame to the output unit in the input unit, in case a termination destination which an OAM frame received from outside indicates is the node and the received OAM frame is to be transmitted to the output unit and terminating an OAM frame transmitted from the input unit in the output unit.

A transfer system according to the present invention includes a node in an MPLS (Multi Protocol Label Switching) network, wherein the node includes: an input unit which receives an OAM (Operation Administration and Maintenance) frame including TTL (Time To Live) from outside of the node; and an output unit which transmits an OAM frame to outside of the node, wherein the input unit, in case a termination destination which an OAM frame received from outside indicates is the node itself and the received OAM frame is to be transmitted to the output unit, sets the TTL to a specific value and transmits the received OAM frame to the output unit; and the output unit terminates an OAM frame transmitted from the input unit.

An input circuit according to the present invention is installed in a node used for an MPLS (Multi Protocol Label Switching) network, wherein the circuit receives an OAM (Operation Administration and Maintenance) frame including TTL (Time To Live) from outside of the node, and wherein in case a termination destination which an OAM frame received from outside indicates is the node and the received OAM frame is to be transmitted to an output unit which is installed in the node and which transmits an OAM frame to outside of the node, the circuit sets the TTL to a specific value and transmits an OAM frame to the output unit.

An output circuit according to the present invention is installed in a node used for an MPLS (Multi Protocol Label Switching) network, wherein in case an input unit receives an OAM (Operation Administration and Maintenance) frame including TTL (Time To Live) from outside of the node, and in case a termination destination which the OAM frame received from outside indicates is the node and the received OAM frame is to be transmitted by setting the TTL to a specific value, the circuit terminates an OAM frame transmitted from the input unit.

Advantageous Effects of Invention

The present invention can, by making a structure and operation as mentioned above, provide the effect that it can process an OAM frame in an output line card.

DESCRIPTION OF EMBODIMENTS

Next, the embodiment of the present invention will be described with reference to the drawings. First, a summary of a label transfer device will be described as a transfer device (node) according to the present invention. The label transfer device according to the present invention will be described, in order to simplify a description, taking a chassis type including input line cards which are input units and output line cards which are output units as an example. Further, the label transfer device according to the present invention does not need to be of a chassis type necessarily, and can also be of a single board type including input ports which are input units and output ports which are output units.

The label transfer device according to the present invention includes an OAM processing unit which, in case an OAM (Operation Administration and Maintenance) frame which should be terminated is received at the input line card mentioned above, determines whether a target (Target) ID (IDentifier) stored in the OAM frame coincides with its own card ID; and in case they coincide, transmits a normal OAM reply frame to a transmission source and in case they are different, sets TTL (Time to live: number of transfer hops of packet) of the OAM frame to an abnormal value set in advance (for example, a set value for recognizing that it is not a usual frame in the output line card) and transfers it to an output line card.

Also, the label transfer device according to the present invention includes in the output line card mentioned above, a TTL processing unit which detects a TTL value in a header of an input frame and extracts a frame of which the TTL value is an abnormal value; and an OAM processing unit which, in case the frame extracted from the TTL processing unit is an OAM frame, compares target ID information stored in the OAM frame with its own card ID; and when they coincide, transmits a normal OAM reply frame to a transmission source and in case they are different, transmits an error OAM reply frame to a transmission source.

As a result, in the label transfer device according to the present invention, because a trouble status of the output line card of a repeating device can be monitored, in other words, because a transmission device can also monitor a trouble status of the output line card of a repeating device, an OAM frame can be processed within the output line card.

Figure 1:
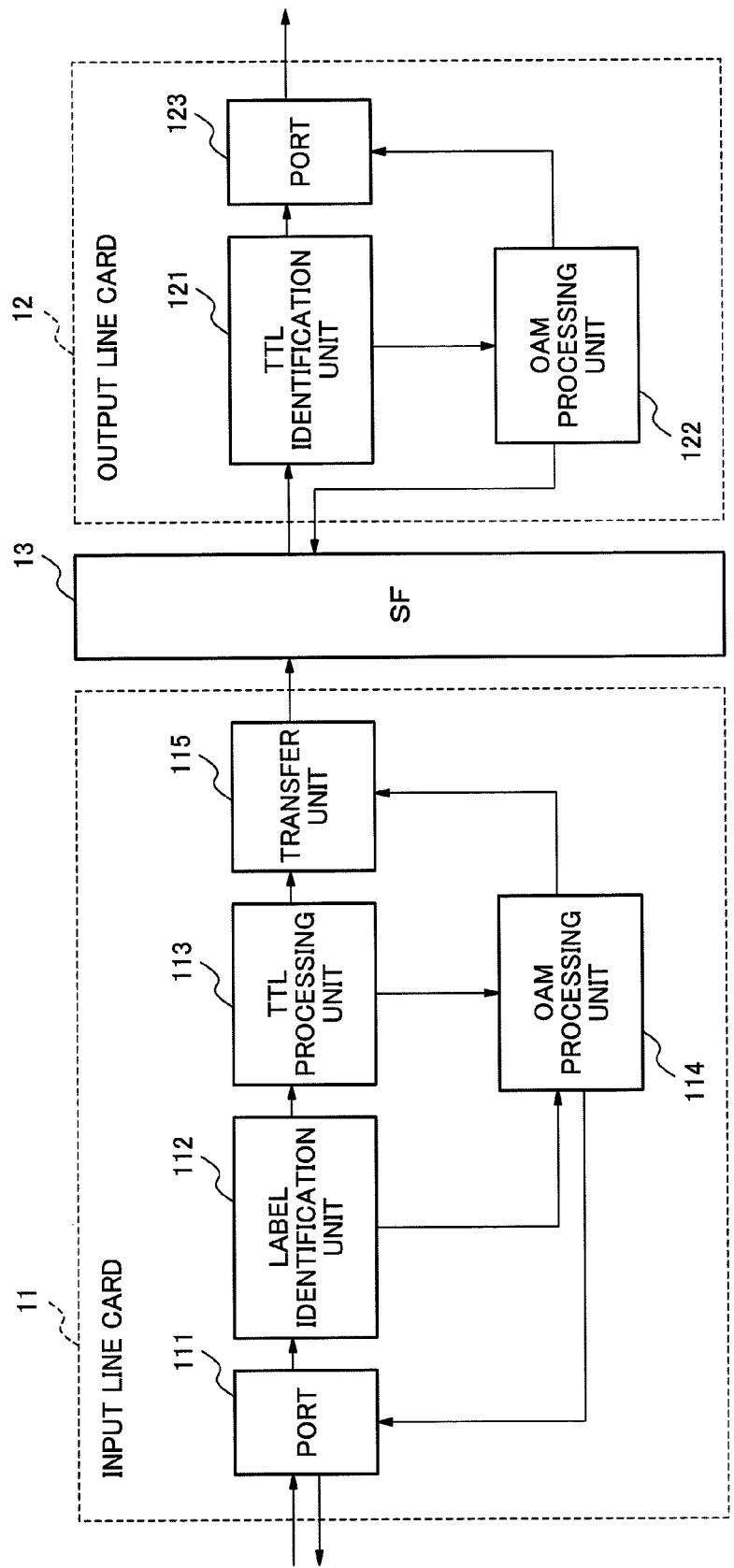
FIG. 1 is a block diagram showing an exemplary configuration of the label transfer device according to the first embodiment of the present invention.

FIG. 1 is a block diagram showing an exemplary configuration of the label transfer device according to the first embodiment of the present invention. In FIG. 1, the label transfer device according to the first embodiment of the present invention is structured to include an input line card 11, output line card 12 and a switch fabric (hereinafter, referred to as SF) 13 which connects between those line cards.

The input line card 11 includes a port 111, a label identification unit 112, a TTL processing unit 113, an OAM processing unit 114 and a transfer unit 115. The port 111 transfers a frame received from outside to, the label identification unit 112 and outputs a frame received from the OAM processing unit 114 to outside.

The label identification unit 112 identifies an LSP (Label Switched Path) label of a frame received from the port 111, and in case it is a label which should be transferred, transfers the received frame to the TTL processing unit 113. Also, in case it is a label which should be terminated, the label identification unit 112 reads an identification header of the received frame and distinguishes whether it is an OAM frame.

When it is an OAM frame, the label identification unit 112 transfers it to the OAM processing unit 114 and when it is not an OAM frame, discards it or performs other termination processing. Because it is not related to the present invention directly, description for other termination processing in the label identification unit 112 will be omitted.

The TTL processing unit 113 detects TTL of a frame received from the label identification unit 112, and when TTL>1, after calculating "TTL=TTL−1" and rewriting the TTL, transfers it to the transfer unit 115. When TTL=1, the TTL processing unit 113 reads an identification header of the received frame, and distinguishes whether it is an OAM frame.

When it is an OAM frame, the TTL processing unit 113 transfers it to the OAM processing unit 114 and when it is not an OAM frame, discards it or performs other termination processing. Because it is not related to the present invention directly, description for other termination processing in the TTL processing unit 113 will be omitted.

The OAM processing unit 114 receives an OAM frame from the label identification unit 112 or the TTL processing unit 113, judges a type of the corresponding OAM frame and processes it. Hereinafter, by taking the case when the OAM frame is a Ping message as an example, OAM processing will be described.

The OAM processing unit 114 reads TLV (Type/Length/Value) of the Ping message received, and in case a target ID coincides with its own card ID, generates a reply OAM frame which sets a source (Source) ID of TLV of the received message to a target ID and its own card ID to a source ID, and returns it to the port 111.

However, in case a target ID of the received Ping message does not coincide with its own card ID, it sets TTL of the received OAM frame to an abnormal TTL (TTL=0, for example) and transfers it to the transfer unit 115, and leaves return processing of a reply OAM frame to the output line card 12.

Hereinafter, in order to simplify descriptions, the TTL value of the OAM frame transferred from the input line card to the output line card is set to 0. However, it does not need to be TTL=0 necessarily. If the output line card 12 can recognize that it is not a usual frame, for example, by inserting another abnormal TTL value, it is also fine.

Also, the OAM processing unit 114 is made to be able to support a technology mode related to the present invention mentioned above and a technology mode according to this embodiment simultaneously. By using a special purpose field of a received OAM frame, it is decided whether to operate in the technology mode related to the present invention or whether to operate in the technology mode according to this embodiment.

As for the special purpose field of the OAM frame, it can be considered to use a Reserved area of a payload of the OAM, to use a type (Type) and so on. In order to distinguish the technology mode related to the present invention and the technology mode according to this embodiment, it is also possible to define tentatively a special purpose field value as "0" for the technology mode related to the present invention and "1" for the technology mode according to this embodiment.

In case an OAM frame of the technology mode according to this embodiment is received, processing of the OAM processing unit 114 is as stated above. On the other hand, in case an OAM frame of the technology mode related to the present invention is received, the OAM processing unit 114 reads TLV of the Ping message received first, and confirms whether a target ID coincides with its own card ID.

In case they coincide, the OAM processing unit 114 generates a reply OAM frame which sets a source ID of TLV of the received message to a target ID and its own card ID to a source ID, and returns it to the port 111. On the contrary, in case a target ID does not coincide with its own card ID, the OAM processing unit 114 generates an error reply message which sets its own card ID to the source ID and returns it to the port 111.

The transfer unit 115 swaps a label of a frame received from the TTL processing unit 113 and the OAM processing unit 114, designates a transfer destination port and transfers the received frame to SF13.

The output line card 12 includes a TTL identification unit 121, an OAM processing unit 122 and a port 123. The TTL identification unit 121 detects a TTL value of a frame received from SF13, and when TTL>=1, transfers it to the port 123 and when TTL=0, transfers it to the OAM processing unit 122.

The OAM processing unit 122 receives a frame received from the TTL identification unit 121, judges a type of an OAM frame and processes it. Hereinafter, OAM processing will be described taking the case when the OAM frame is a Ping message as an example.

The OAM processing unit 122 reads TLV of the received Ping message, and in case a target ID is its own card ID, generates a normal reply message which sets a source ID of TLV of the received message to a target ID and its own card ID to a source ID, and returns it to SF13. Also, the OAM processing unit 114 reads TLV of the received Ping message, and in case a target ID is blank, may judge that the target of the received Ping message is its own card.

However, in case a target ID of the received Ping message is not its own card ID, the OAM processing unit 122 generates a reply message which shows that TTL has Expired and returns it to SF13.

Figure 2:
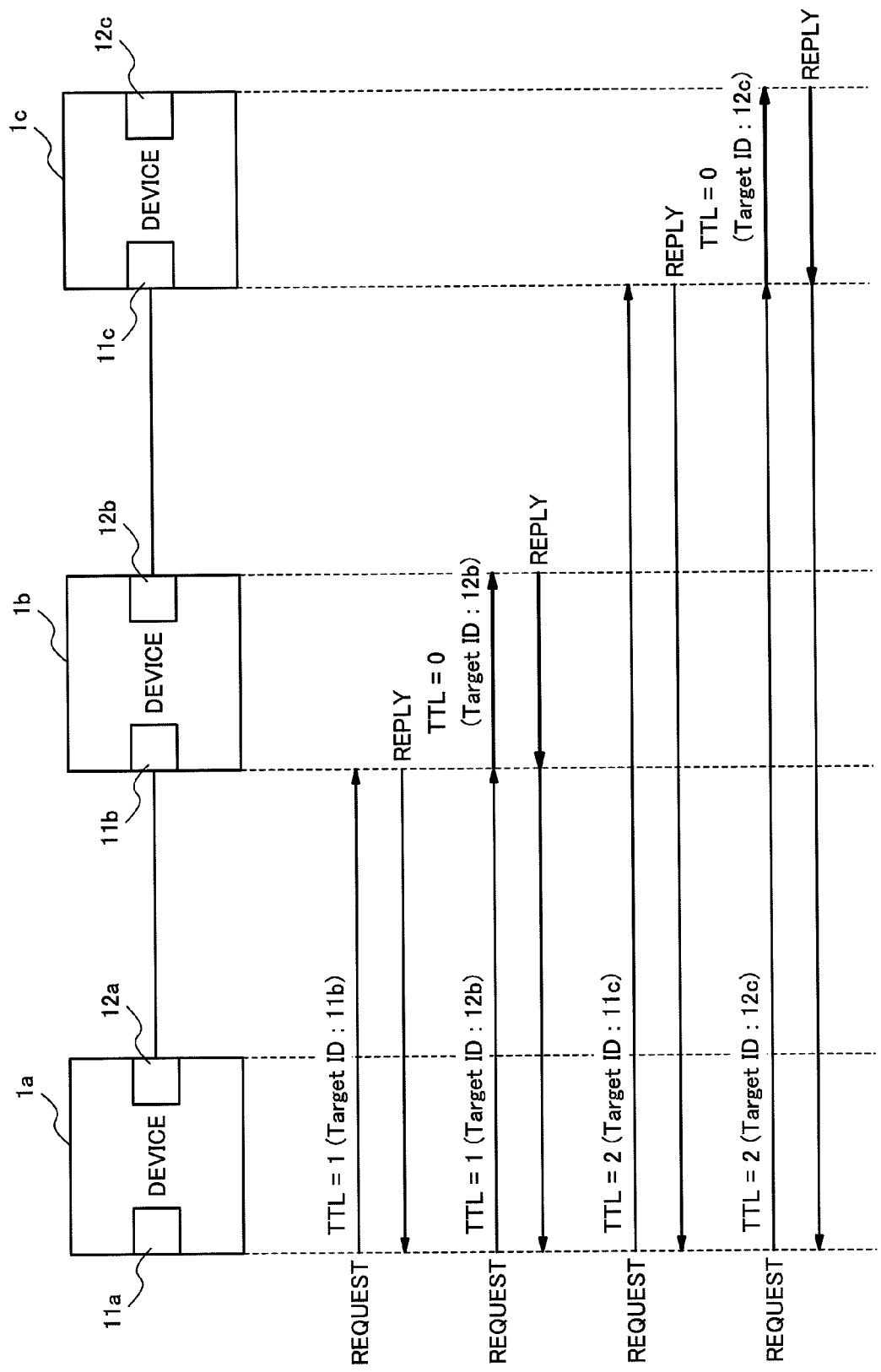
FIG. 2 is a figure showing an outline of the entire operation of the label transfer device according to the first embodiment of the present invention.

FIG. 2 is a figure showing an outline of the entire operation of the label transfer device according to the first embodiment of the present invention. A transfer method in the first embodiment of the present invention will be described with reference to these FIG. 1 and FIG. 2.

For example, it is supposed that a Ping message of TTL=1 (target ID=11*b*) is transmitted from an input line card 11*a* of a device 1*a* to an input line card 11*b* of a device 1*b*. The input line card 11*b* of the device 1*b* which receives it returns a normal reply message to the device 1*a* because the target ID is its own card ID.

Also, it is supposed that a Ping message of TTL=1 (target ID=12*b*) is transmitted from the input line card 11*a* of the device 1*a* to an output line card 12*b* of the device 1*b*. The input line card 11*b* of the device 1*b* which receives it is first terminated by TTL=0, and in case a target ID is different from its own card ID, transfers the received Ping message of TTL=0 to the output line card 12*b* just as it is.

Because the output line card 12*b* which receives the Ping message performs OAM processing only for a frame of TTL=0, in case TTL=0 and a target ID is its own card ID, the output line card 12*b* returns a normal reply message to the device 1*a*.

Figure 3:
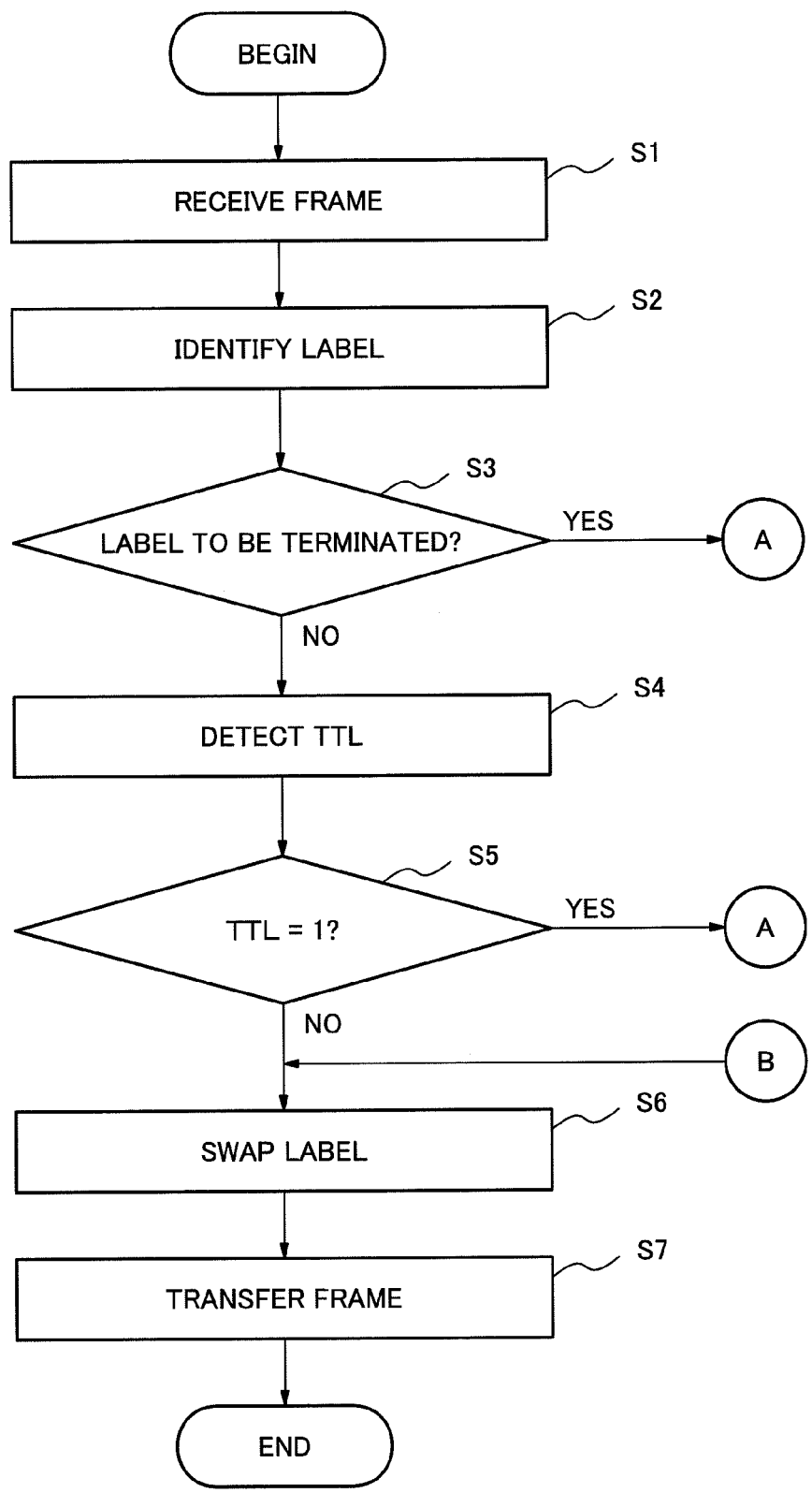
FIG. 3 is a flow chart showing operation of the label transfer device according to the first embodiment of the present invention.
Figure 4:
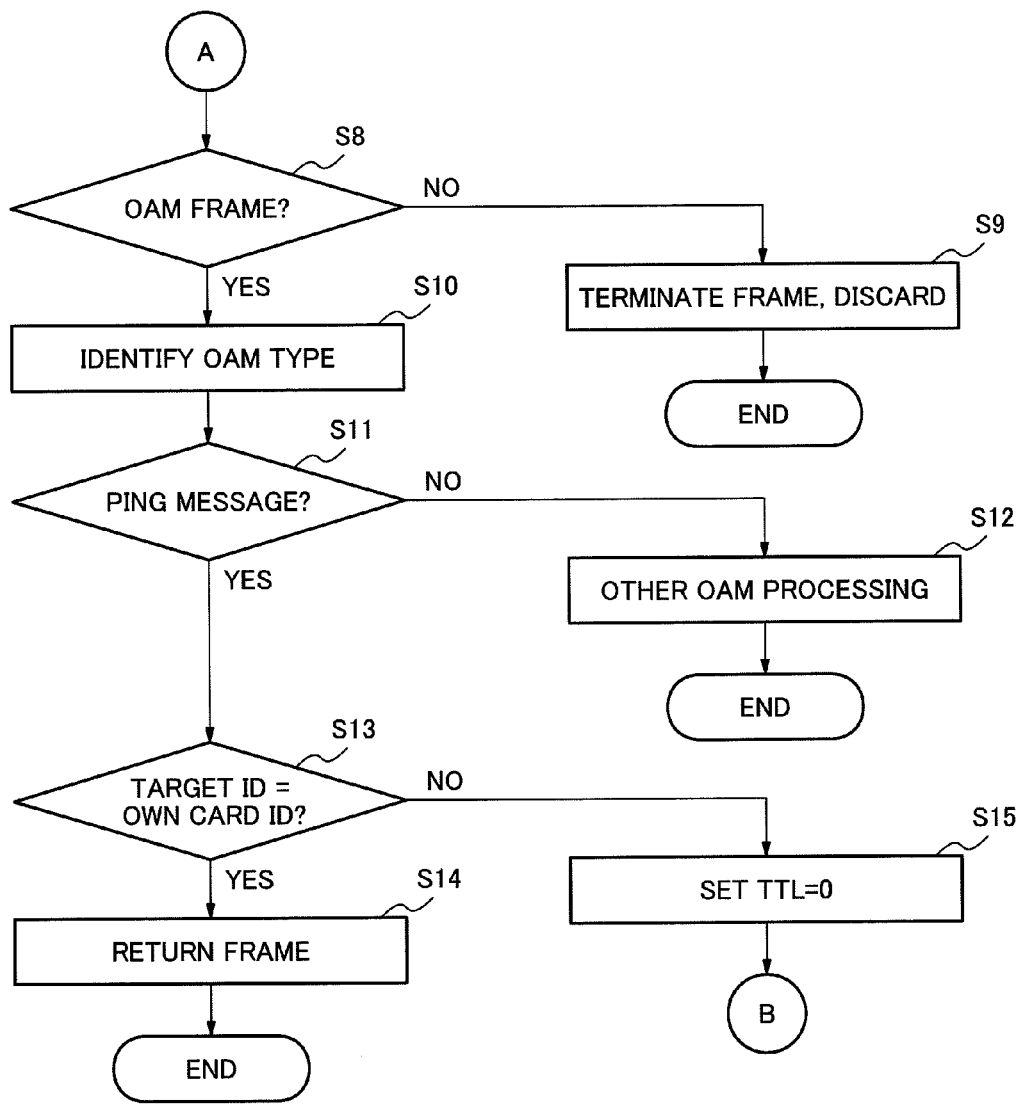
FIG. 4 is a flow chart showing operation of the label transfer device according to the first embodiment of the present invention.
Figure 5:
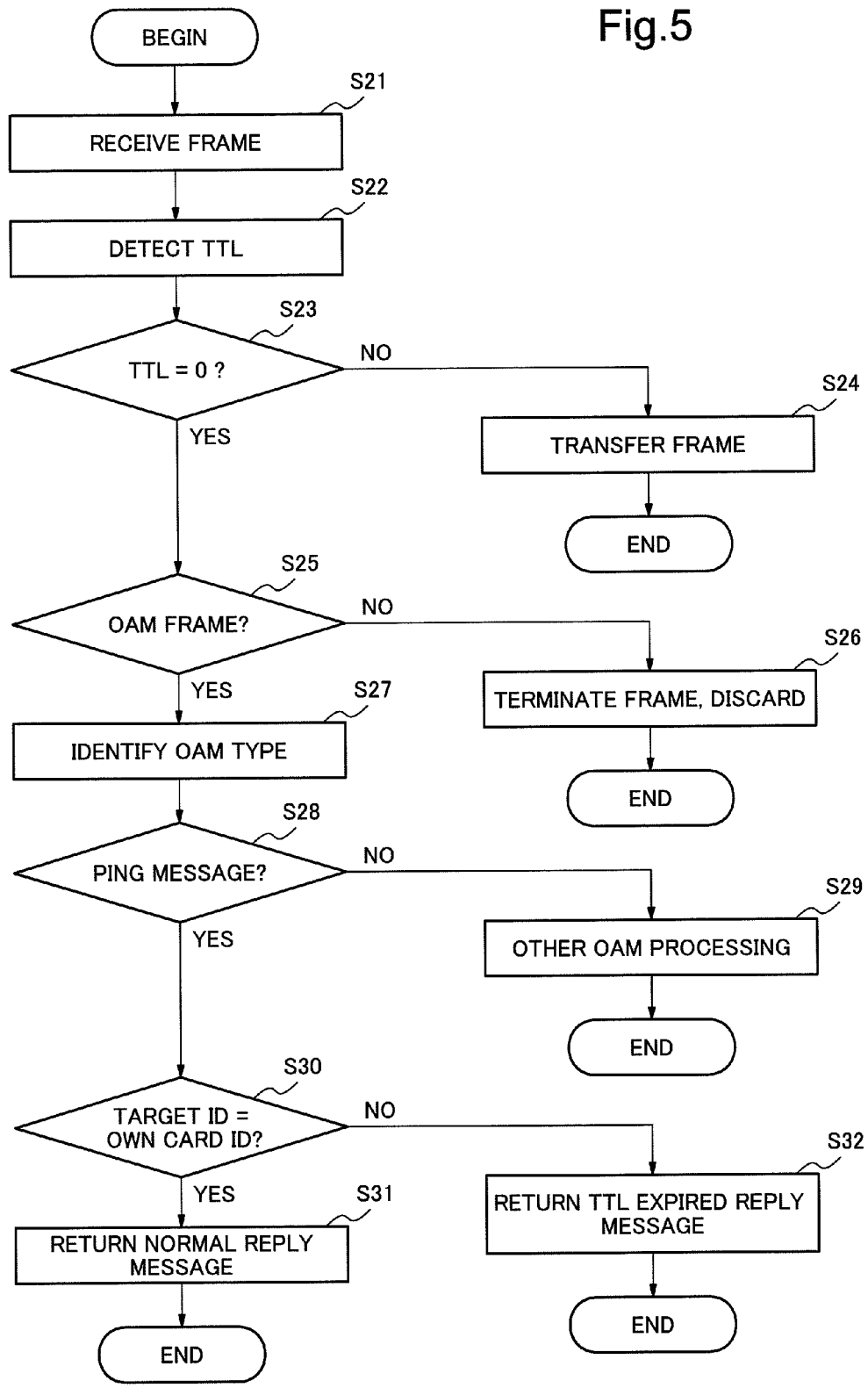
FIG. 5 is a flow chart showing operation of the label transfer device according to the first embodiment of the present invention.

FIGS. 3-5 are flow charts showing operation of the label transfer device according to the first embodiment of the present invention. Details of the operation of the label transfer device according to the first embodiment of the present invention will be described with reference to these FIGS. 1-5. Further, processing operation shown in FIGS. 3-5 is realized by a CPU (central processing unit) (not shown) in the label transfer device executing a program stored in a memory and so on (not shown). Or, processing operation shown in FIGS. 3-5 may be used when a programmable logic device is designed and realized by operation of hardware.

The label identification unit 112 of the input line card 11 identifies an LSP label of a frame received by the port 111 (FIG. 3, steps S1 and S2), and in case the corresponding label should not be terminated (should be transferred) (NO in FIG. 3, step S3), transfers the received frame to the TTL processing unit 113.

Also, in case it is a label which should be terminated (YES in FIG. 3, step S3), the label identification unit 112 reads an identification header of the received frame, and distinguishes whether it is an OAM frame (FIG. 4, step S8). When it is an OAM frame (YES in FIG. 4, step S8), the label identification unit 112 transfers the frame to the OAM processing unit 114, and when it is not an OAM frame (NO in FIG. 4, step S8), discards it or performs other termination processing (FIG. 4, step S9). Because it is not related to the present invention directly, description for other termination processing in the label identification unit 112 will be omitted.

The TTL processing unit 113 detects TTL of a frame received from the label identification unit 112 (FIG. 3, step S4), and when TTL>1 (NO in FIG. 3, step S5), after calculating "TTL=TTL−1" and rewriting the TTL, transfers it to the transfer unit 115 (FIG. 3, steps S6 and S7).

When TTL=1 (YES in FIG. 3, step S5), the TTL processing unit 113 reads an identification header of the received frame, and distinguishes whether it is an OAM frame (FIG. 4, step S8). When it is an OAM frame (YES in FIG. 4, step S8), the TTL processing unit 113 transfers the frame to the OAM processing unit 114, and when it is not an OAM frame (NO in FIG. 4, step S8), discards the frame or performs other termination processing (FIG. 4, step S9). Because it is not related to the present invention directly, description for other termination processing in the TTL processing unit 113 will be omitted.

The OAM processing unit 114 receives an OAM frame from the label identification unit 112 or the TTL processing unit 113, judges a type of the corresponding OAM frame and processes it (FIG. 4, step S10). Hereinafter, OAM processing will be described taking the case when the OAM frame is a Ping message as an example.

The OAM processing unit 114 reads TLV of the received Ping message, and in case a target ID is its own card ID (YES in FIG. 4, step S11 and YES in Step S13), generates a reply message which sets a source ID of TLV of the received message to a target ID and its own card ID to a source ID, and returns it to the port 111 (FIG. 4, step S14).

However, in case a target ID of the received Ping message is not its own card ID (NO in FIG. 4; step S13), the OAM processing unit 114 transfers the received message to the transfer unit 115.

The transfer unit 115 swaps a label of a frame received from the TTL processing unit 113 (FIG. 3, step S6), designates a transfer destination port and transfers the received frame to SF13 (FIG. 3, step S7).

The TTL identification unit 121 of the output line card 12 detects a TTL value of the received frame (FIG. 5, steps S21 and S22), and when TTL>0 (NO in FIG. 5, step S23), transfers it to the port 123, and when TTL=0 (YES in FIG. 5, step S23), transfers it to the OAM processing unit 122.

When a frame is received from the TTL identification unit 121, the OAM processing unit 122 distinguishes whether it is an OAM frame (FIG. 5, step S25). When it is not an OAM frame (NO in FIG. 5, step S25), the OAM processing unit 122 discards the frame or performs other termination processing (FIG. 5, step S26). Because it is not related to the present invention directly, description for termination processing when it is not an OAM frame will be omitted.

Next, the OAM processing unit 122 judges a type of the OAM frame, and processes it (FIG. 5, step S27). Hereinafter, OAM processing will be described by taking the case when the OAM frame is a Ping message as an example.

The OAM processing unit 122 reads TLV of the received Ping message, and in case a target ID is its own card ID (YES in FIG. 5, step S28 and YES in Step S30), generates a normal reply message which sets a source ID of TLV of the received message to a target ID and its own card ID to a source ID, and returns it to SF13 (FIG. 5, step S31).

However, in case a target ID of the received Ping message is not its own card ID (NO in FIG. 5, step S30), the OAM processing unit 122 generates a reply message which shows that TTL has Expired and returns it to SF13 (FIG. 5 step S32).

In case the OAM frame is not a Ping message (NO in FIG. 5, step S28), the OAM processing unit 122 performs other OAM processing (FIG. 5, step S29). Because it is not related to the present invention directly, description for other OAM processing in the OAM processing unit 122 will be omitted.

As stated above, according to this embodiment, because by including: the OAM processing unit 114 of the input line card 11 which includes a function to transfer an OAM frame of TTL=0 to the output line card 12 just as it is in case an OAM frame which should be terminated is received and a target ID is different from its own card ID; and the OAM processing unit 122 of the output line card 12 which includes a function which in case an OAM frame of TTL=0 is received from the input line card 11, by comparing a target ID and its own card ID, returns a normal OAM reply frame in case they coincide and an abnormal OAM reply frame in case they are different to a transmission source of the received OAM frame; the transmission device can monitor also a trouble status of the output line card 12 of the repeating device, the OAM frame can be processed in the output line card 12.

Figure 6:
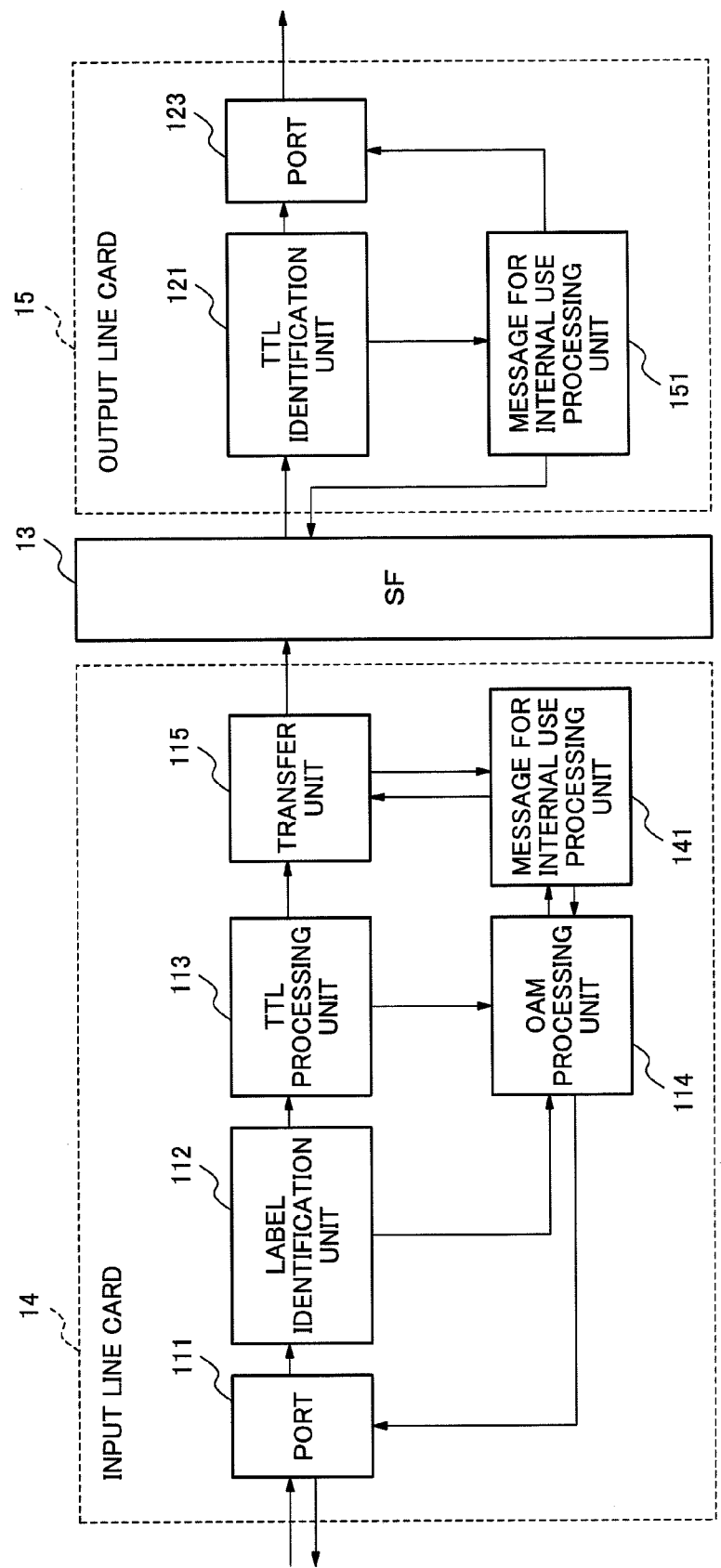
FIG. 6 is a block diagram showing an exemplary configuration of the label transfer device according to the second embodiment of the present invention.

FIG. 6 is a block diagram showing an exemplary configuration of the label transfer device according to the second embodiment of the present invention. In FIG. 6, the label transfer device according to the second embodiment of the present invention is structured like the input line card 11 and the output line card 12 of the label transfer device according to the first embodiment of the present invention shown in FIG. 1 except that a message for internal use processing unit 141 is added to a structure of the input line card 11 and a message for internal use processing unit 151 is installed instead of the OAM processing unit 122 of the output line card 12, and an identical code is attached to an identical component. Also, operation of the identical component is similar to that of the label transfer device according to the first embodiment of the present invention.

In case target ID information of an OAM frame is received from the OAM processing unit 114, the message for internal use processing unit 141 of the input line card 14 generates a confirmation message for internal use including the target ID information and transmits it to the transfer unit 115.

After that, the message for internal use processing unit 141 waits for a reply message for internal use from the output line card 15 for a fixed time, and in case it is received, notifies the OAM processing unit 114 of information which shows that the output line card 15 is normal and of information which shows whether a target ID coincides with the output line card 15.

On the contrary, in case a reply message cannot be received within a fixed time, the message for internal use processing unit 141 notifies the OAM processing unit 114 of information which shows that the output line card 15 is abnormal.

In case a confirmation message for internal use is received from SF13, the message for internal use processing unit 151 of the output line card 15 compares target ID information of the confirmation message with its own card ID, and in case they coincide, returns a reply message for internal use which shows that the target ID coincides, and in case they are different, returns a reply message for internal use which shows that the target ID does not coincide.

Hereinafter, OAM processing will be described by taking the case when the OAM frame is a Ping message as an example.

A point that an operation of the input line card 14 according to this embodiment is different from the operation of the input line card 11 of the first embodiment of the present invention shown in FIG. 3 and FIG. 4 is the operation from Step S13 of FIG. 4 to Step S6 of FIG. 3.

In the operation of the first embodiment of the present invention, whereas a received OAM frame of TTL=0 is transmitted to the output line card 12 via the transfer unit 115 just as it is, a reply message for internal use is transmitted and received instead of the received OAM frame in the present embodiment.

Specifically, in case a target ID is different from its own card ID (NO in FIG. 4, step S13), the OAM processing unit 114 of the input line card 15, instead of swapping a label (FIG. 3, step S6) and transferring it to the output line card 12 (FIG. 3, step S7), manages the card ID of the output line card 15 in advance, and confirms first whether a target ID of the received OAM frame coincides with the card ID of the output line card 15.

In case they coincide, the OAM processing unit 114 generates a confirmation message for internal use to confirm a status of the output line card 15 in the message for internal use processing unit 141 and transmits it to the transfer unit 115. After that, in case a reply message for internal use is received from the output line card 15 in a fixed time, the OAM processing unit 114 generates a reply message which sets the card ID of the output line card 15 to a source ID and returns it to the port 111, and in case a reply message cannot be received within a fixed time, it generates an error reply message which sets its own card ID to a source ID and returns it to the port 111.

On the contrary, in case a target ID of the received OAM frame is different from the card ID of the output line card 15, the OAM processing unit 114 does not confirm the status of the output line card 15, generates an error reply OAM frame and returns it.

Next, a point that an operation of the output line card 15 according to this embodiment is different from the operation of the output line card 12 according to the first embodiment of the present invention shown in FIG. 5 is that it does not need TTL processing and processes a message for internal use instead of processing the OAM frame.

As stated above, according to this embodiment, because by including: the OAM processing unit 114 of the input line card 14 including a function to transmit an internal confirmation message including the target ID to the output line card 15 in case an OAM frame which should be terminated is received and the target ID is different from its own card ID, and a function to generate and transmit a reply OAM frame to the transmission source device of the input OAM frame in case an internal reply message is received from the output line card 15; and the message for internal use processing unit 151 of the output line card 15 including a function which, in case a message for internal use is received from the input line card 14, compares a target ID and its own card ID, and transmits to the input line card 14, in case they coincide, an internal reply message which shows they coincide, and in case they are different, an internal reply message which shows they do not coincide; the transmission device can also monitor a trouble status of the output line card 15 of the repeating device, the OAM frame can be processed within the output line card 15.

Figure 7:
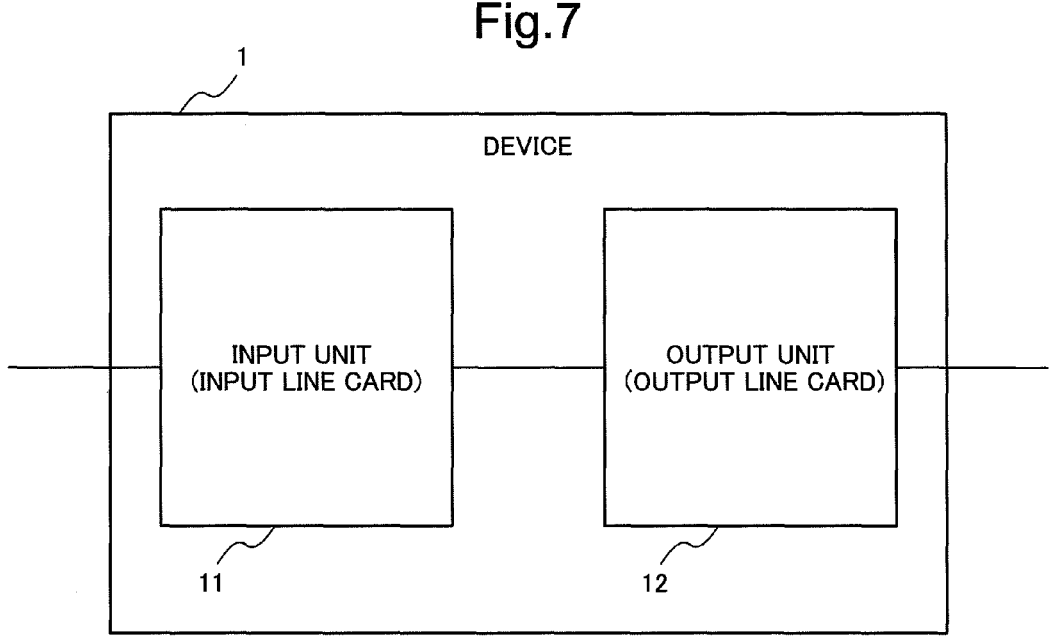
FIG. 7 is a block diagram showing an exemplary configuration of the label transfer device according to the present invention.
Figure 8:
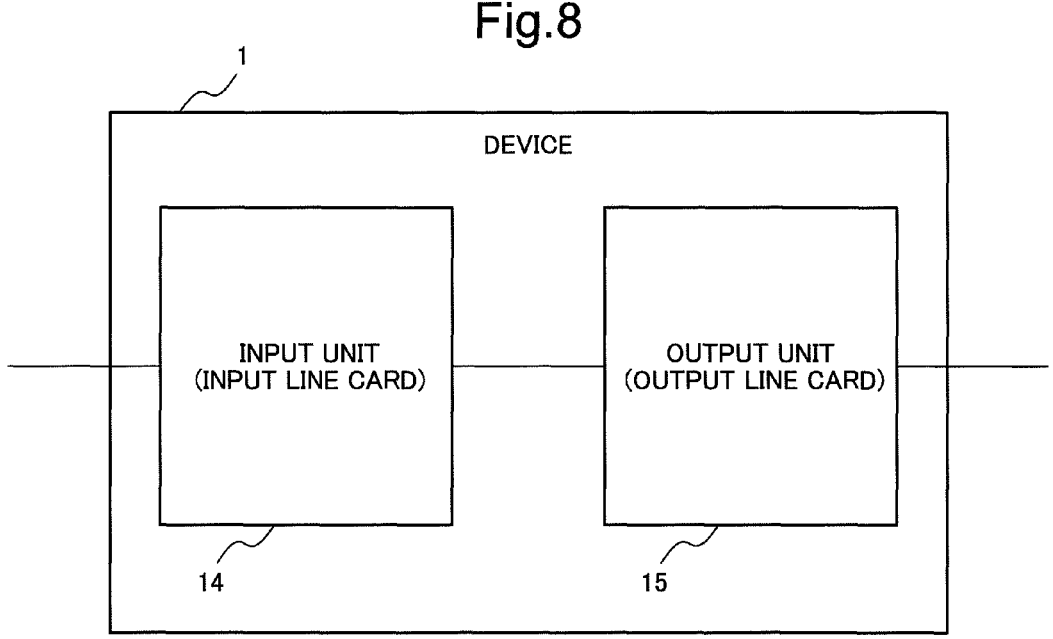
FIG. 8 is a block diagram showing an exemplary configuration of another label transfer device according to the present invention.

As a structure for solving the problem mentioned above to process an OAM frame within the output line card, there are also a structure shown in FIG. 7 and a structure shown in FIG. 8. FIG. 7 corresponds to the first embodiment of the present invention, and FIG. 8 corresponds to the second embodiment of the present invention.

In FIG. 7, a device (label transfer device) 1 is structured including an input unit (input line card) 11 and an output unit (output line card) 12.

In the structure shown in FIG. 7 mentioned above, in case a termination destination which a field which indicates a path of a frame of an OAM frame received from outside or a field which indicates a number of transfer times between devices indicates is the device itself, and an OAM frame received from outside is to be transmitted to the output unit 12, the input unit 11 sets a field which indicates a number of transfer times between devices to a specific value and transmit the OAM frame to the output unit 12. In case a field which indicates a number of transfer times between devices of the OAM frame transmitted from the input unit 11 is a specific value, the output unit 12 terminates the OAM frame transmitted from the input unit 12. As a result, an OAM frame can be processed in the output unit 12 also according to the structure shown in FIG. 7.

In FIG. 8, a device (label transfer device) 1 is structured including an input unit (input line card) 14 and an output unit (output line card) 15.

In the structure shown in FIG. 8 mentioned above, the input unit 14 receives an OAM frame including a field which indicates a path of a frame, a field which indicates a number of transfer times between devices, and a field which indicates a termination destination within the device, from outside the device 1; and the output unit 15 transmits an OAM frame to outside of the device 1.

In case a termination destination which a field which indicates a path of a frame of the OAM frame received from outside or a field which indicates a number of transfer times between devices indicates is the device itself, and an OAM frame received from outside is to be transmitted to the output unit 15, the input unit 14 generates a message for internal use and transmits it to the output unit 15; and the output unit 15 receives the message for internal use transmitted from the input unit 14. As a result, an OAM frame can be processed in the output unit 15 also according to the structure shown in FIG. 8.

Figure 9:
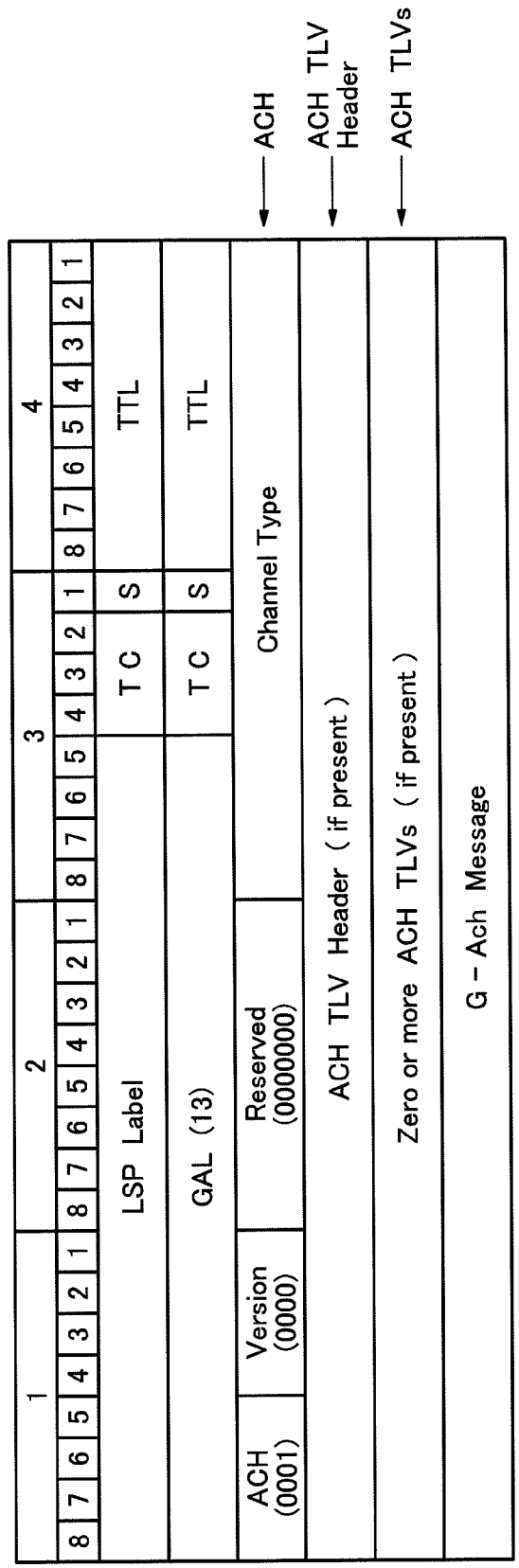
FIG. 9 is a figure showing a format of a G-ACH frame used for the present invention.
Figure 10:
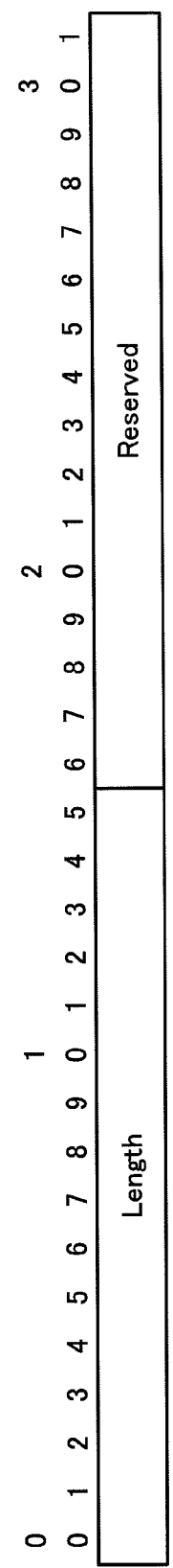
FIG. 10 is a figure showing a format of an ACH TLV Header used for the present invention.
Figure 11:
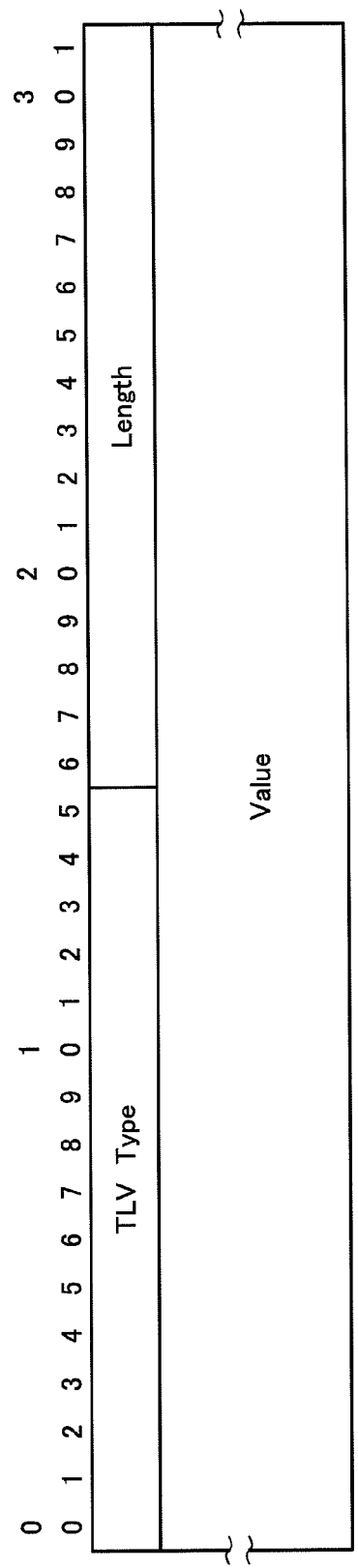
FIG. 11 is a figure showing a format of ACH TLV used for the present invention.
Figure 12:
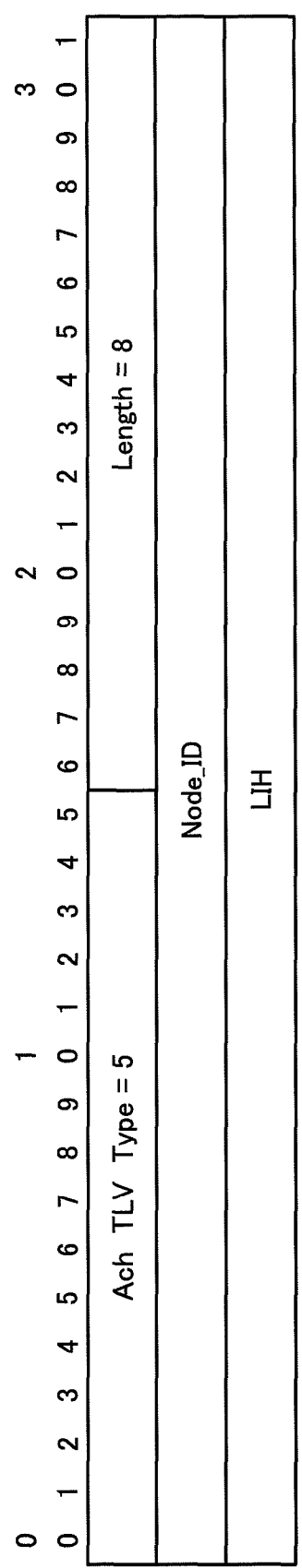
FIG. 12 is a figure showing an example of ACH TLV for specifying a line card used for the present invention.

FIG. 9 is a figure showing a format of a G-ACH (Generic-Associated CHannel) frame used in the present invention, FIG. 10 is a figure showing a format of an ACH TLV Header used in the present invention, FIG. 11 is a figure showing a format of ACH TLV used in the present invention, and FIG. 12 is a figure showing an example of the ACH TLV for specifying a line card used in the present invention.

The format shown in FIG. 9 indicates a frame format of MPLS Generic Associated Channel indicated in RFC (RFC) 5586 (non-patent literature 2). In the format shown in FIG. 9, GAL (Generic Associated channel Label) is used at the bottom of the label stack of LSP, and shows that ACH (Associated Channel Header) follows. Number 13 of the reserved label is used for this GAL.

Leading 4 bits of ACH is "0001b" and shows that it is a Control Channel of such as an OAM. Also, ACH includes a Channel Type field which indicates a type (for example, such as warning and performance monitoring) of the OAM.

As shown in FIG. 10, the ACH TLV Header is header information for indicating a total length of ACH TLVs, and its size is 4 bytes. As shown in FIG. 11, ACH TLV follows the ACH TLV Header and is a field for storing Value which shows an identifier of a transmission source or a transmission destination. Detailed contents such as an OAM message are included in a G-Ach Message.

In FIG. 11, the first 2 bytes of the ACH TLV indicate a type of Value (TLV Type), and the next 2 bytes indicate Length of Value. Value is different in its size depending on the type of the identifier.

For example, as an example of Value for specifying a line card, as shown in FIG. 12, it is possible to set it as type of Value of ACH TLV=5, Length of Value=8, Node_ID for specifying the device, and Logical Interface Handle (LIH); and the size in that case is 12 bytes.

In determination processing of an OAM frame in the technology related to the present invention mentioned above, in the processing of an LSP Label, by reading the LSP Label outside the received frame, and in case TTL>1, the received frame is not terminated and is transferred to the next stage after performing subtraction to TTL. In case TTL=1 and S (the stacking bit indicates) bit is 0, the label is removed and a label of a second stage is searched.

On the contrary, in case TTL=1 and S bit is 1, termination processing is performed not as an LSP but as a PW (Pseudo Wire) frame. Because PW OAM is similar to LSP OAM with regard to OAM operation, in the present invention, LSP OAM will be described as an example and description of PW OAM will be omitted.

Whereas in case the input line card receives an OAM frame of TTL=1, it is transferred to the output line card by reading the target ID of the ACH TLV and when it is not its own card ID in the first and the second embodiment of the present invention, it may be transferred to all the output line cards without selecting to which output line card to output as a mode to transfer it to the output line card.

Also, it is possible that the input line card mentioned above includes a card ID list of the output line cards, and by searching a target ID among the card ID list, transfers the OAM frame only to a specific output line card. Further, because the operation of the output line card after transfer is the same as the first embodiment of the present invention mentioned above, description of the operation will be omitted.

In the determination processing of an OAM frame mentioned above, in the processing after GAL Label, in case a label of the second stage mentioned above is GAL, and when Channel Type of the ACH header following the GAL shows OAM, it determines that it is an OAM frame and performs OAM processing. In case a label of the second stage is not GAL, it performs processing other than OAM processing.

Whereas the target ID of ACH TLV is read and determined in order to identify the input line card and the output line card in the first and the second embodiment of the present invention mentioned above, the input line card and the output line card may be identified by using an arbitrary field of the OAM frame. In that case, it is desirable as mentioned above to use a field which the input unit can read especially before the target ID of ACH TLV. As a result, the line card which the transmission source of the OAM frame makes as a target can be identified more quickly. Specifically, the following determination method can be used.

(1) A method which, in an input line card, reads a value of a TC (Traffic Class) field in GAL and determines in which line card to process, can be considered. While a TC field in an LSP Label cannot be abused since it is used in order to decide a transfer priority of a frame, the TC field in GAL can be used for a specific purpose without causing any problem since it is generally not in use.

(2) A method which determines in which line card to process by defining a new value of the Channel Type of ACH can be considered. For example, whereas Channel Type is generally used in order to indicate a type of OAM, it is also possible to define as: when Channel Type="X", it is OAM which goes to an input line card and when Channel Type="Y", it is OAM which goes to an output line card.

(3) A method which determines whether it goes to an input line card or goes to an output line card by defining a new value in the ACH Reserved area can be considered. For example, in case of LSP-ping, it is possible to define as: when it is "1", it is OAM which goes to an input line card, and when it is "2", it is OAM which goes to an output line card.

Also, according to the first and the second embodiment of the present invention mentioned above, in case an OAM frame of TTL=1 is received by the input line card, by reading a target ID of ACH TLV and when it is not its own card ID, it is transferred to the output line card. However, a method which, in the input line card, reads a target ID of ACH TLV and determines for which output line card it is addressed, and transfers the OAM frame only to the specific output line card, can also be considered.

Next, the third embodiment of the present invention will be described. A label transfer device according to the third embodiment of the present invention includes in the input line card mentioned above: a TTL processing unit which, in case an OAM frame which should be processed within its own device, for example, an OAM frame of TTL=1 or an OAM frame using a specific label is received, terminates the frame and in addition, by setting an abnormal value (TTL=0, for example) to TTL, transfers it to the output line card also; and an OAM processing unit which determines whether a target ID stored in the OAM frame received from the TTL processing unit coincides with its own card ID, and in case they coincide, transmits a normal OAM reply frame to a transmission source, and in case they are different, discards the corresponding OAM frame.

Also, a label transfer device according to the third embodiment of the present invention includes in the output line card mentioned above: a TTL processing unit which detects a TTL value in a header of the input frame, and extracts a frame of which the TTL value is an abnormal value, and an OAM processing unit which, in case the frame extracted from the TTL processing unit is an OAM frame, compares target ID information stored in the OAM frame with its own card ID, and in case they coincide, transmits a normal OAM reply frame to a transmission source, and in case they are different, discards it or transmits an error OAM reply frame to a transmission source.

As a result, in the label transfer device according to the third embodiment of the present invention, because a trouble status of the output line card of a repeating device can be monitored, in other words, because a transmission device can monitor also a trouble status of the output line card of a repeating device, an OAM frame can be processed within the output line card. In this case, because the label transfer device according to the third embodiment of the present invention only sets an abnormal value (TTL=0, for example) to TTL in the input line card and transfers it to the output line card, and it is not necessary to determine in which line card to process, processing load in the input line card can be reduced.

Figure 13:
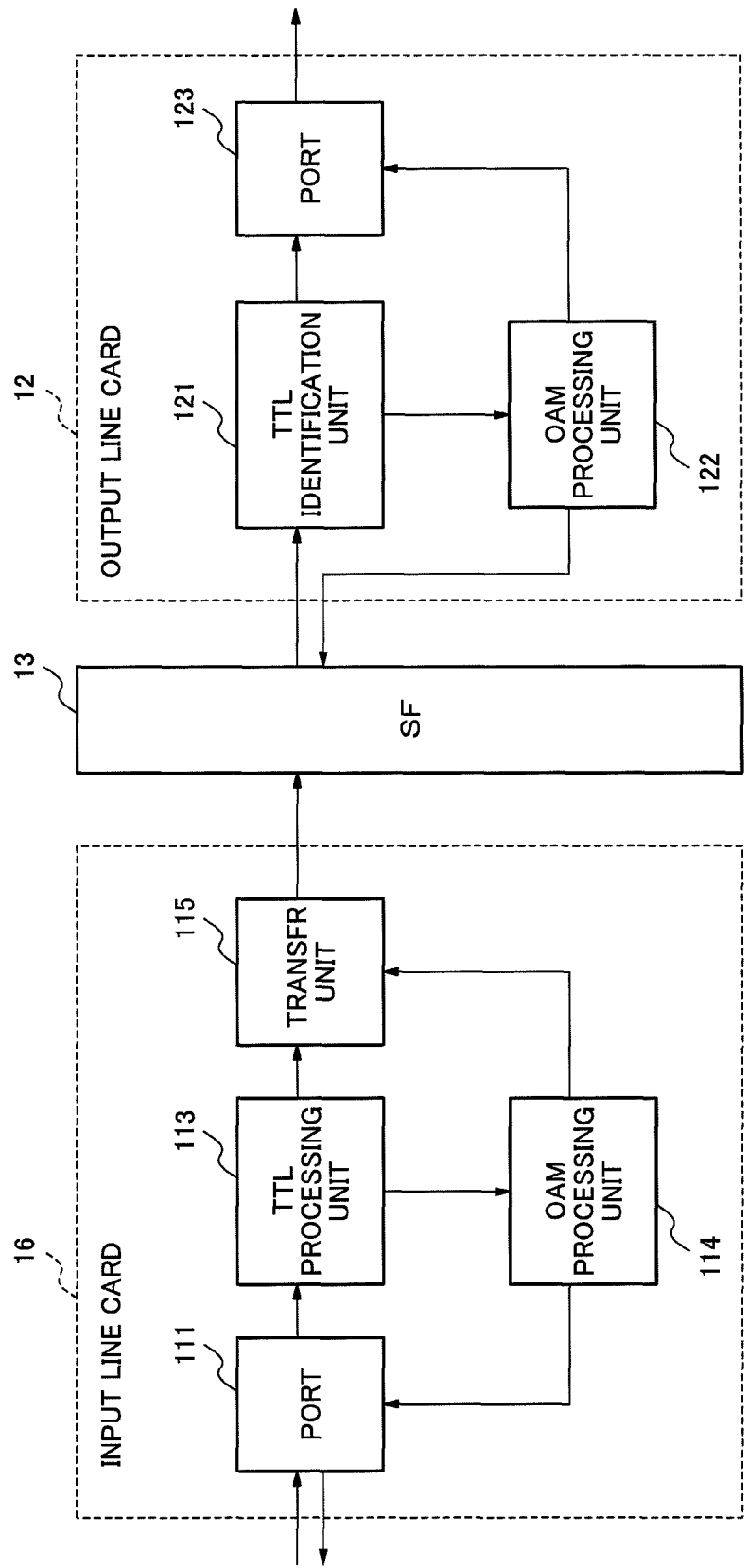
FIG. 13 is a block diagram showing an exemplary configuration of the label transfer device according to the third embodiment of the present invention.

FIG. 13 is a block diagram showing an exemplary configuration of the label transfer device according to the third embodiment of the present invention. In FIG. 13, the label transfer device according to the third embodiment of the present invention is structured including: an input line card 16, an output line card 12, and a switch fabric (hereinafter, referred to as SF) 13 which connects those line cards.

The input line card 16 includes: a port 111, a TTL processing unit 113, an OAM processing unit 114 and a transfer unit 115. The port 111 transfers a frame received from outside to the TTL processing unit 113 and outputs a frame received from the OAM processing unit 114 to outside.

The TTL processing unit 113 detects a label TTL of a frame received from the port 111, and when TTL>1, after calculating "TTL=TTL−1" and rewriting the TTL, transfers it to the transfer unit 115. When it is a frame of TTL=1, the TTL processing unit 113 reads an identification header of the received frame, and distinguishes whether it is an OAM frame. Also, in case a frame of TTL<1 is received, the frame is discarded. A method in which the TTL processing unit 113 extracts a frame with a specific label instead of extracting a frame of TTL=1 can also be considered.

Here, a method to extract a frame with a specific label will be described using FIG. 14. For example, in the device 1 shown in FIG. 14(a), it is supposed that, in case LSP labels of a received frame are α, β and γ, the LSP labels concerned are switched to x, y and z, and transferred, and in case an LSP label of a received frame is δ, the received frame concerned is terminated.

Figures 14A, 14B:
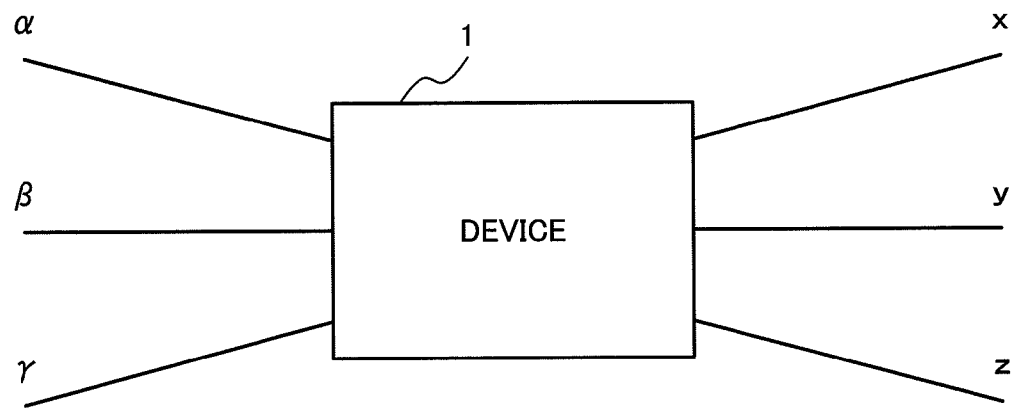
FIG. 14 is a figure showing a method in the present invention to extract a frame including a specific label.

As stated above, handling of the input line card according to an LSP label of the received frame is set in advance, and kept as shown in FIG. 14(b). And, a method which, in case an LSP label of a received frame is δ, supposes that the LSP label concerned is a label which should be terminated and extracts a frame including this LSP label "δ" can be considered. Further, this method is also applicable to the processing of Steps S2 and S3 in FIG. 3, in other words, to determination of whether it is a label which should be terminated.

In case a received frame is not an OAM frame, the TTL processing unit 113 discards it or performs other termination processing. On the other hand, in case a received frame is an OAM frame, the TTL processing unit 113 transfers it to the OAM processing unit 114, and in addition, by setting an abnormal value (TTL=0, for example) to TTL, transfers it to the output line card.

The OAM processing unit 114 receives the OAM frame from the TTL processing unit 113, judges a type of the corresponding OAM frame and processes it. Hereinafter, taking the case when the OAM frame is a Ping message as an example, OAM processing will be described.

In case a Ping message is received, and in case a target ID coincides with its own card ID, the OAM processing unit 114 generates a reply OAM frame (this reply OAM frame corresponds to a Ping reply message which is a reply of the Ping message mentioned above) which sets a source ID included in the received message to a target ID, and its own card ID to a source ID, and returns it to the port 111. On the contrary, in case a target ID is different from its own card ID, the received message is discarded.

The transfer unit 115 swaps a label of a frame received from the TTL processing unit 113, designates a transfer destination port and transfers the received frame to SF 13.

The output line card 12 includes a TTL identification unit 121, an OAM processing unit 122 and a port 123. The TTL identification unit 121 detects a TTL value of a frame received from SF 13, and when TTL>=1, transfers it to the port 123, and when TTL=0, transfers it to the OAM processing unit 122.

The OAM processing unit 122 receives a frame to be received from the TTL identification unit 121, judges a type of the OAM frame and processes it. Hereinafter, OAM processing will be described by taking the case when the OAM frame is a Ping message as an example.

The OAM processing unit 122 reads TLV of the received Ping message, and in case a target ID is its own card ID, generates a normal reply message (Ping reply message) which sets a source ID of TLV of the received message to a target ID and its own card ID to a source ID, and returns it to SF 13.

However, in case a target ID of the received Ping message is not its own card ID, the OAM processing unit 122 discards the received message. However, it is also possible to generate a reply message (Ping reply message) which shows that TTL has Expired as needed and returns it to SF 13.

Figure 15:
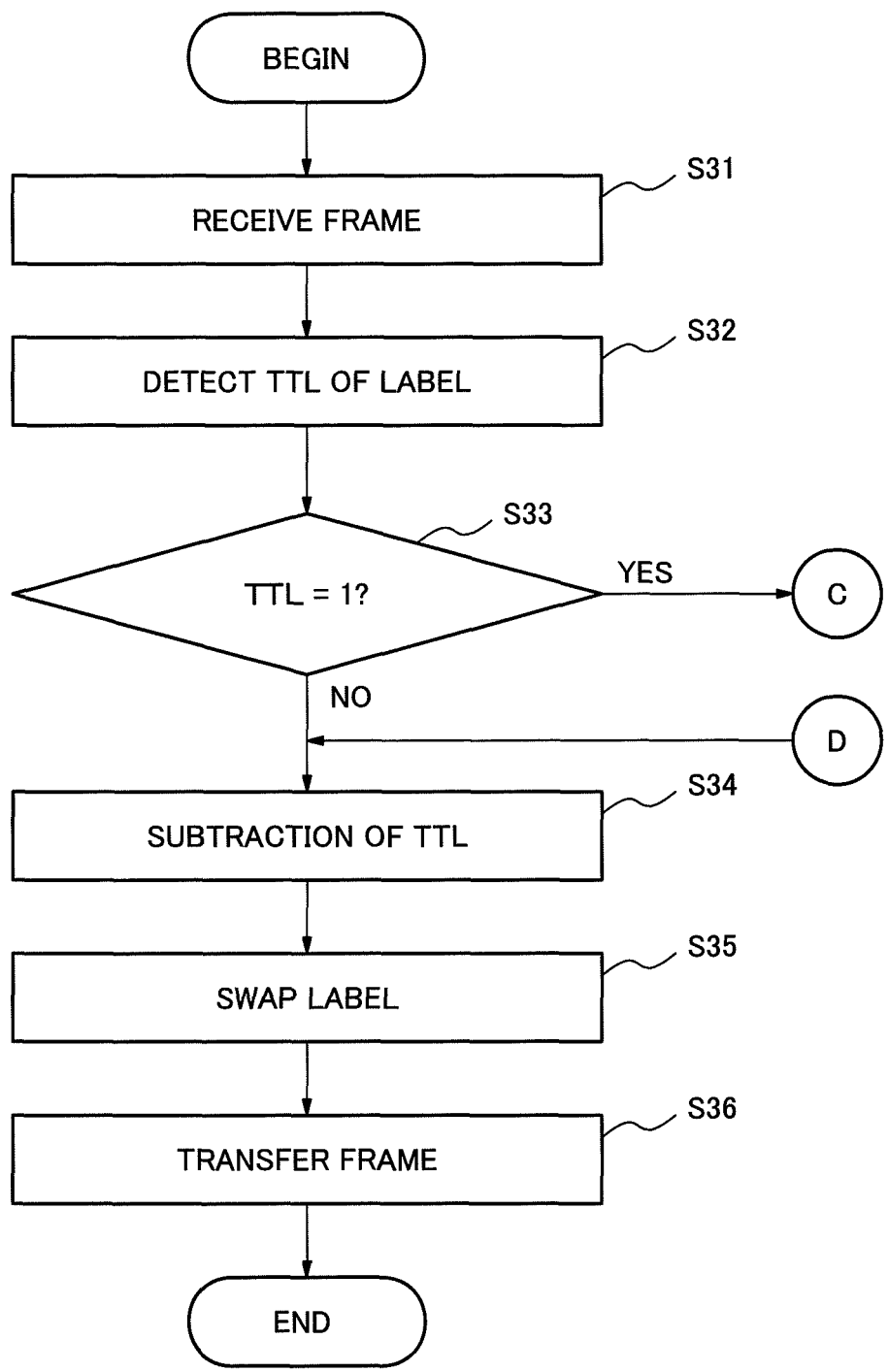
FIG. 15 is a flow chart showing operation of the label transfer device according to the third embodiment of the present invention.
Figure 16:
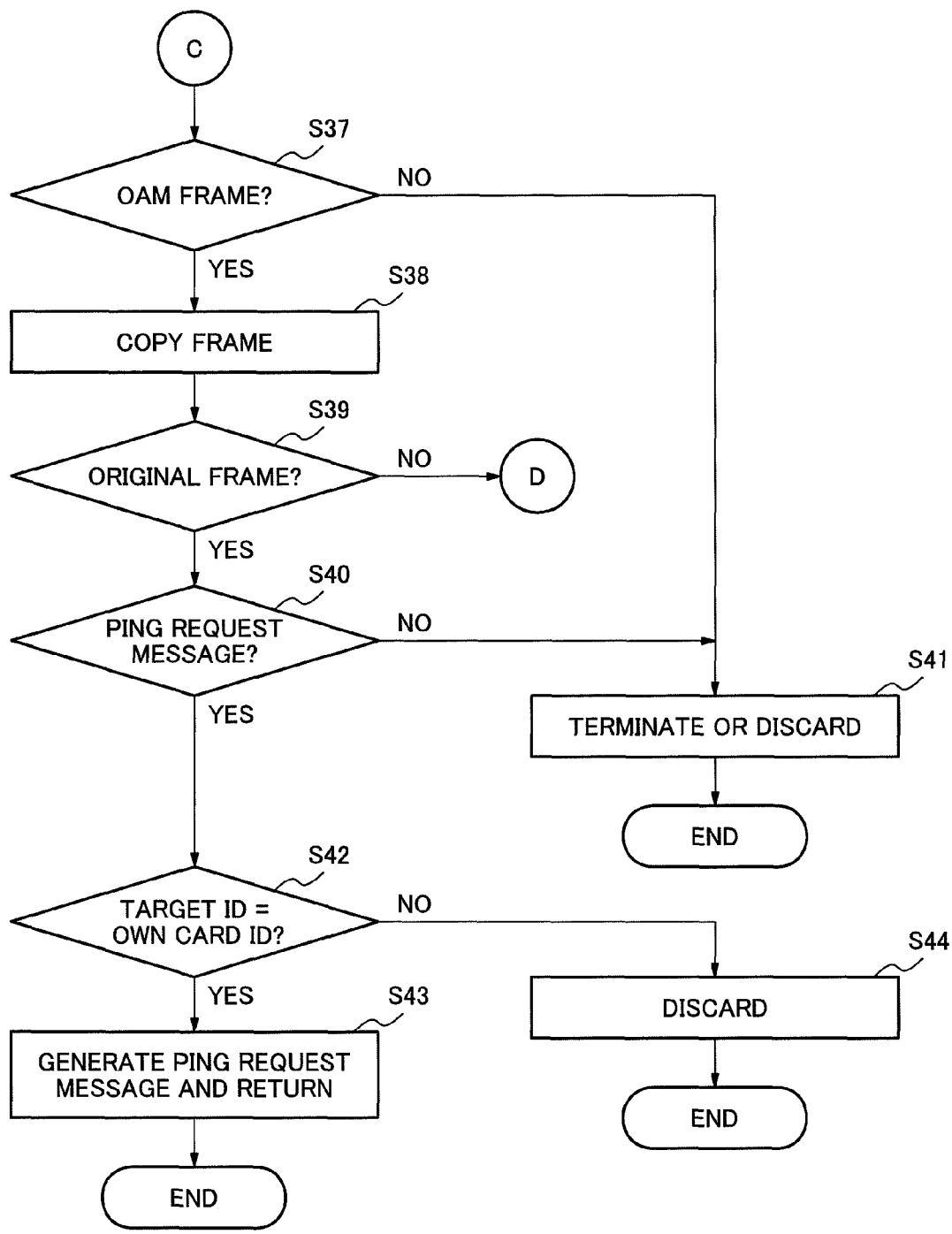
FIG. 16 is a flow chart showing operation of the label transfer device according to the third embodiment of the present invention.
Figure 17:
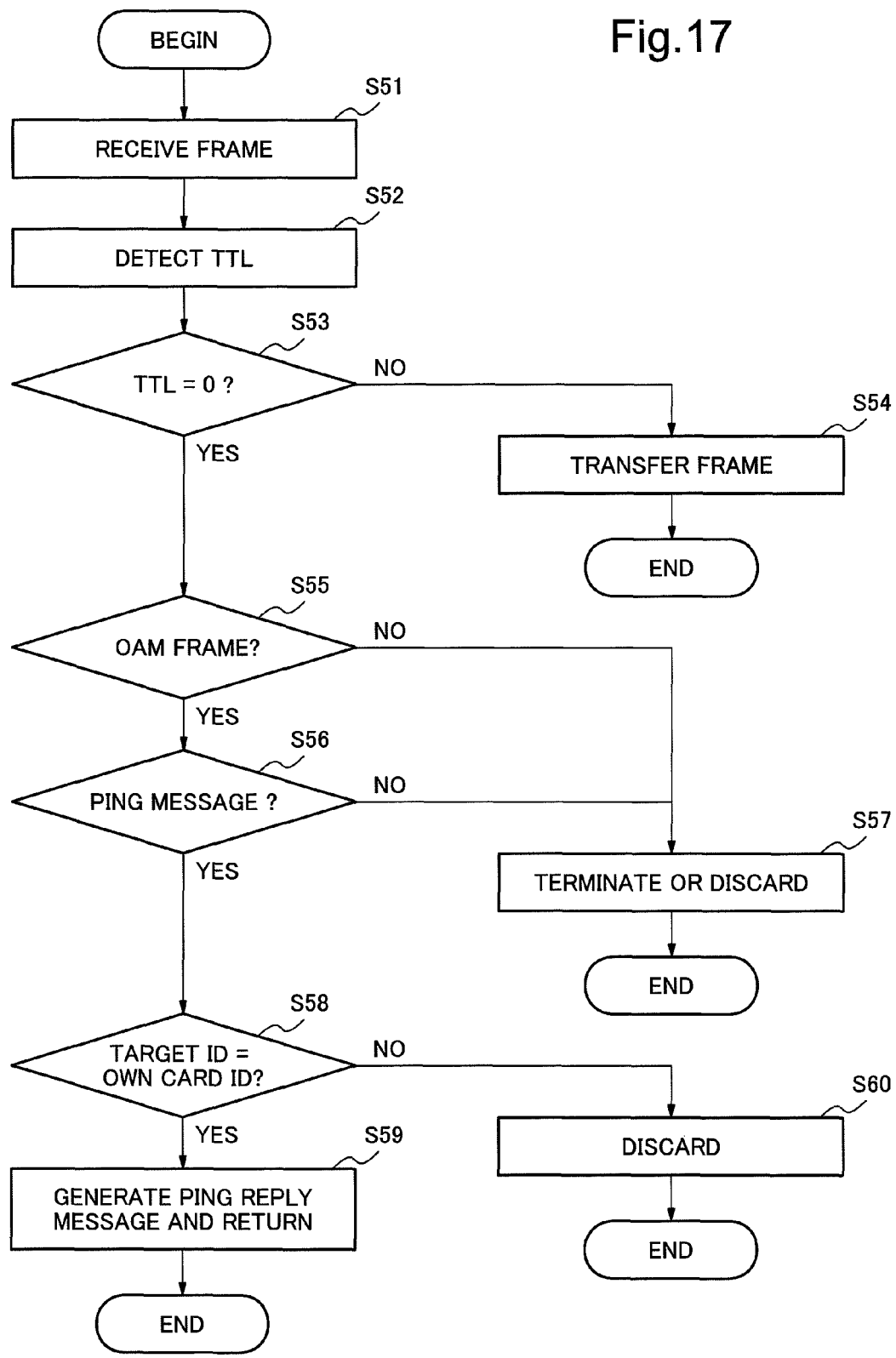
FIG. 17 is a flow, chart showing operation of the label transfer device according to the third embodiment of the present invention.

FIGS. 15-17 are flow charts showing operation of the label transfer device according to the third embodiment of the present invention. Further, processing operation shown in FIGS. 15-17 is realized by a CPU (central processing unit) (not shown) in the label transfer device executing a software program stored in a memory and so on (not shown) or a hardware program such as an FPGA (Field Programmable Gate Array).

The TTL processing unit 112 of the input line card 16 of the label transfer device detects TTL of an LSP label of a frame received by the port 111 (FIG. 15, steps S31 and S32), extracts a frame of TTL=1 (YES in FIG. 15, step S33) and performs OAM determination. Conversely, for other normal frame (NO in FIG. 15, step S33), it performs subtraction of TTL and transfers it (FIG. 15, steps S34-S36).

In case the received frame is not an OAM frame (NO in FIG. 16, step S37), the TTL processing unit 113 terminates the received frame or discards it (FIG. 16, step S41). On the contrary, when the received frame is an OAM frame (YES in FIG. 16, step S37), the TTL processing unit 113 copies the frame (FIG. 16, step S38), transfers the original frame to the OAM processing unit 114 (NO in FIG. 16, step S39), sets an abnormal value (TTL=0, for example) to TTL of the copied frame and transfers it to the transfer unit 115 (YES in FIG. 16, step S39).

The OAM processing unit 114 receives an OAM frame from the TTL processing unit 113, judges a type of the corresponding OAM frame and processes it. In case the OAM frame is a Ping message (NO in FIG. 16, step S40), the OAM processing unit 114 performs other OAM termination or discards it (FIG. 16, step S41). On the contrary, in case the OAM frame is a Ping message (YES in FIG. 16, step S40), the OAM processing unit 114 transfers the OAM frame to the transfer unit 115 and in addition, performs OAM termination processing.

Hereinafter, the OAM termination processing will be described taking the case when the OAM frame is a Ping message as an example.

The OAM processing unit 114 reads TLV of the received Ping message, and in case a target ID is its own card ID (YES in FIG. 16, step S42), generates a reply message which sets a source ID of TLV of the received message to a target ID and its own card ID to a source ID, and returns it to the port 111 (FIG. 16, step S43).

However, in case a target ID of the received Ping message is not its own card ID (NO in FIG. 16, step S42), the OAM processing unit 114 discards the received message (FIG. 16, step S44).

When a copied frame is received from the TTL processing unit 113, the transfer unit 115 swaps a label of the frame received from the TTL processing unit 113 (FIG. 15, step S35), designates a transfer destination port and transfers the received frame (FIG. 15, step S36).

The TTL identification unit 121 of the output line card 12 detects a TTL value of the received frame (FIG. 17, steps S51 and S52) and when TTL>0 (NO in FIG. 17, step S53), transfers it to the port 123 (FIG. 17, step S54), and when TTL=0 (YES in FIG. 17, step S53), transfers it to the OAM processing unit 122.

When a frame is received from the TTL identification unit 121, the OAM processing unit 122 distinguishes whether it is an OAM frame (FIG. 17, step S55). When it is not an OAM frame (NO in FIG. 17, step S55), the OAM processing unit 122 discards the frame or performs other termination processing (FIG. 17, step S57). Because it is not related to the present invention directly, description for termination processing in case of not an OAM frame will be omitted.

Next, the OAM processing unit 122 judges a type of the OAM frame, and processes it (FIG. 17, step S56). Hereinafter, OAM processing will be described by taking the case when the OAM frame is a Ping message as an example.

The OAM processing unit 122 reads TLV of the received Ping message, in case a target ID is its own card ID (YES in FIG. 17, step S58), generates a normal reply message and returns it to SF13 (FIG. 17, step S59).

However, in case a target ID of the received Ping message is not its own card ID (NO in FIG. 17, step S58), the OAM processing unit 122 discards the received message (FIG. 17, step S60).

In case the OAM frame is not a Ping message (NO in FIG. 17, step S56), the OAM processing unit 122 performs other OAM termination or discards it (FIG. 17, step S57). Because it is not related to the present invention directly, description for other OAM termination in the OAM processing unit 122 will be omitted.

As state above, the label transfer device according to this embodiment includes in the label transfer device including the input unit and the output unit: the TTL processing unit 113 in the input unit which detects TTL and a type of the received frame, and in case of an OAM frame of TTL=1, terminates the OAM frame, and in addition, by setting an abnormal value to TTL of the OAM frame, transfers it to the output unit; and because only the corresponding output line card performs OAM answer, can process the OAM frame within the output line card 12, and in addition, without delay in the input line card 16, grasp a status of the output line card 12 at high speed.

Figure 18:
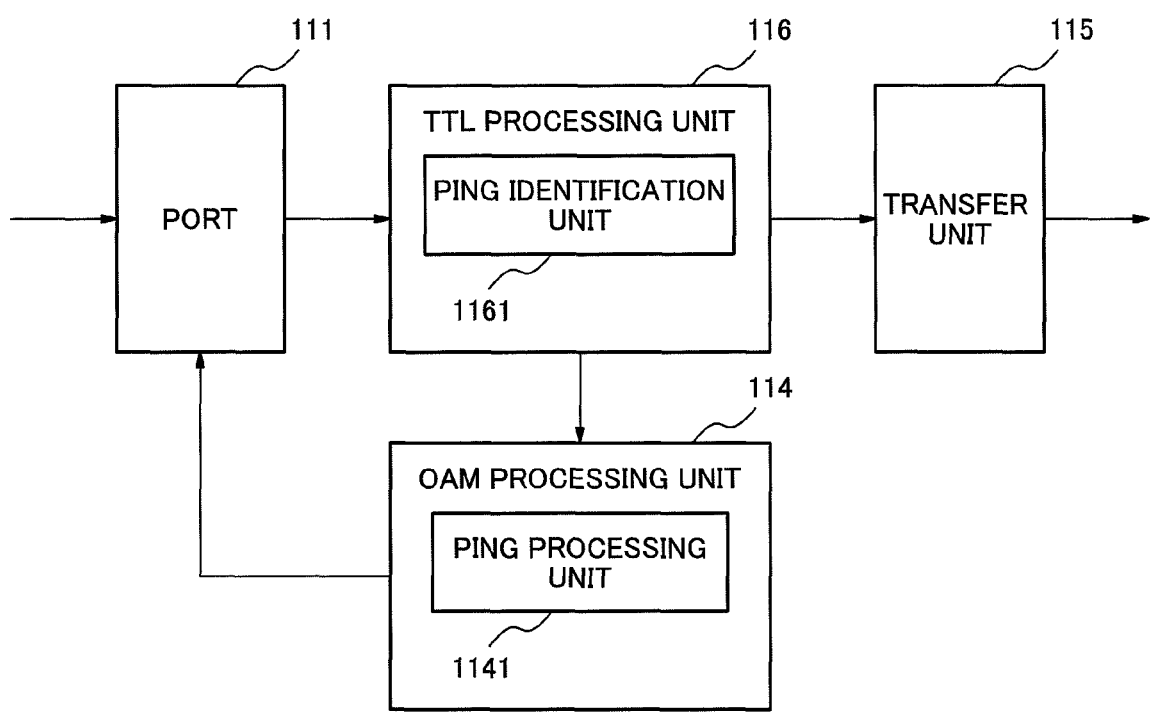
FIG. 18 is a block diagram showing an exemplary configuration of the label transfer device according to the fourth embodiment of the present invention.

Further, the fourth embodiment of the present invention will be described. The label transfer device according to the fourth embodiment of the present invention is different as shown in FIG. 18 in a TTL processing unit 116 compared with the third embodiment of the present invention shown in FIG. 13. Because the port 111, the OAM processing unit 114 and the transfer unit 115 are of the same structure as the third embodiment of the present invention, the detailed description will be omitted. Also, operation of the identical component in the fourth embodiment of the present invention is the same operation as the label transfer device according to the third embodiment of the present invention mentioned above.

The TTL processing unit 116 of the fourth embodiment of the present invention is different from the TTL processing unit 113 of the third embodiment of the present invention and includes a Ping identification unit 1161 for a Ping message. While identification of a Ping message is all executed in the OAM processing unit 114 in the third embodiment of the present invention, identification of a Ping message is executed in the TTL processing unit 116 in the fourth embodiment of the present invention.

Figure 19:
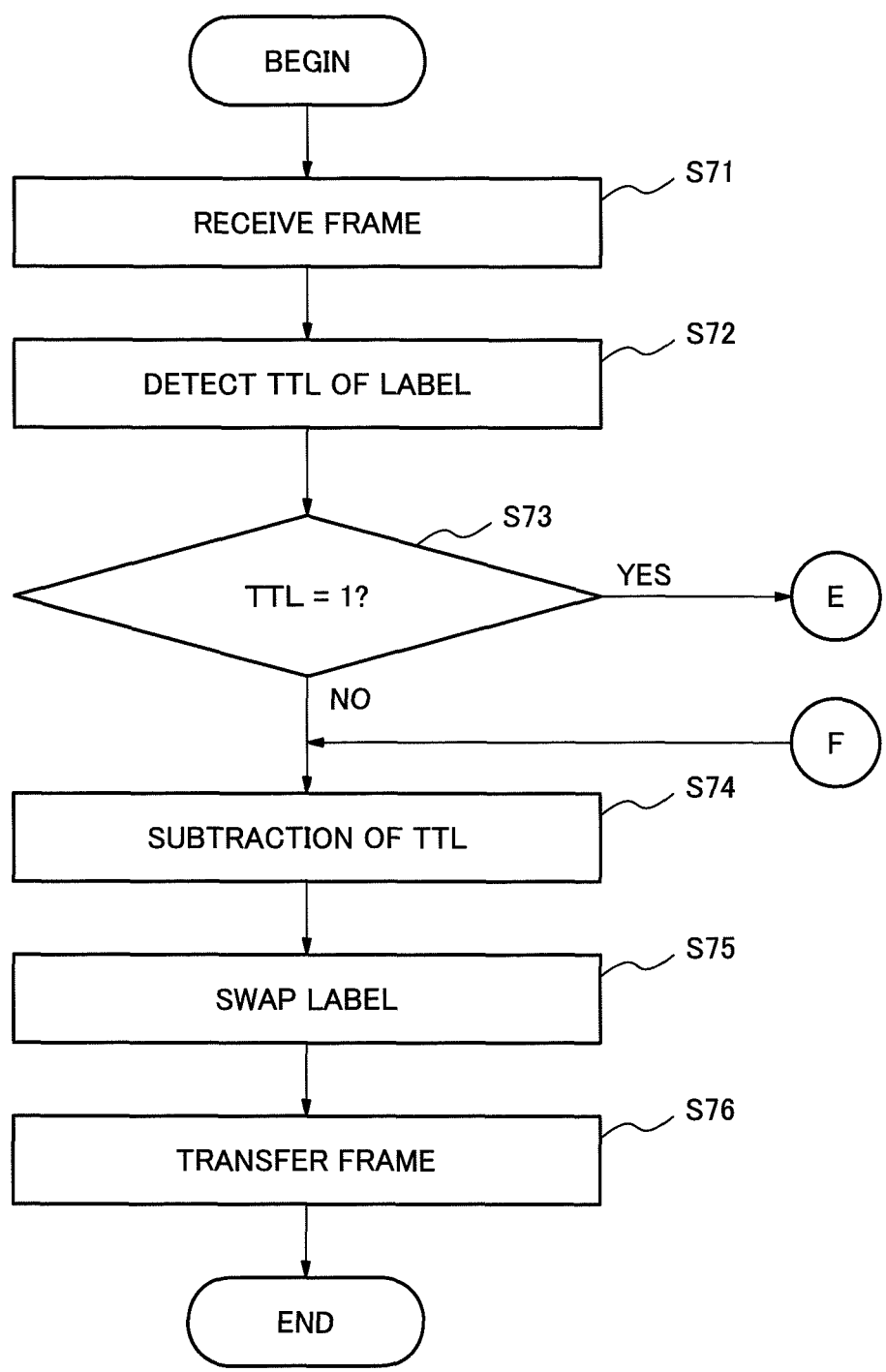
FIG. 19 is a flow chart showing operation of the label transfer device according to the fourth embodiment of the present invention.
Figure 20:
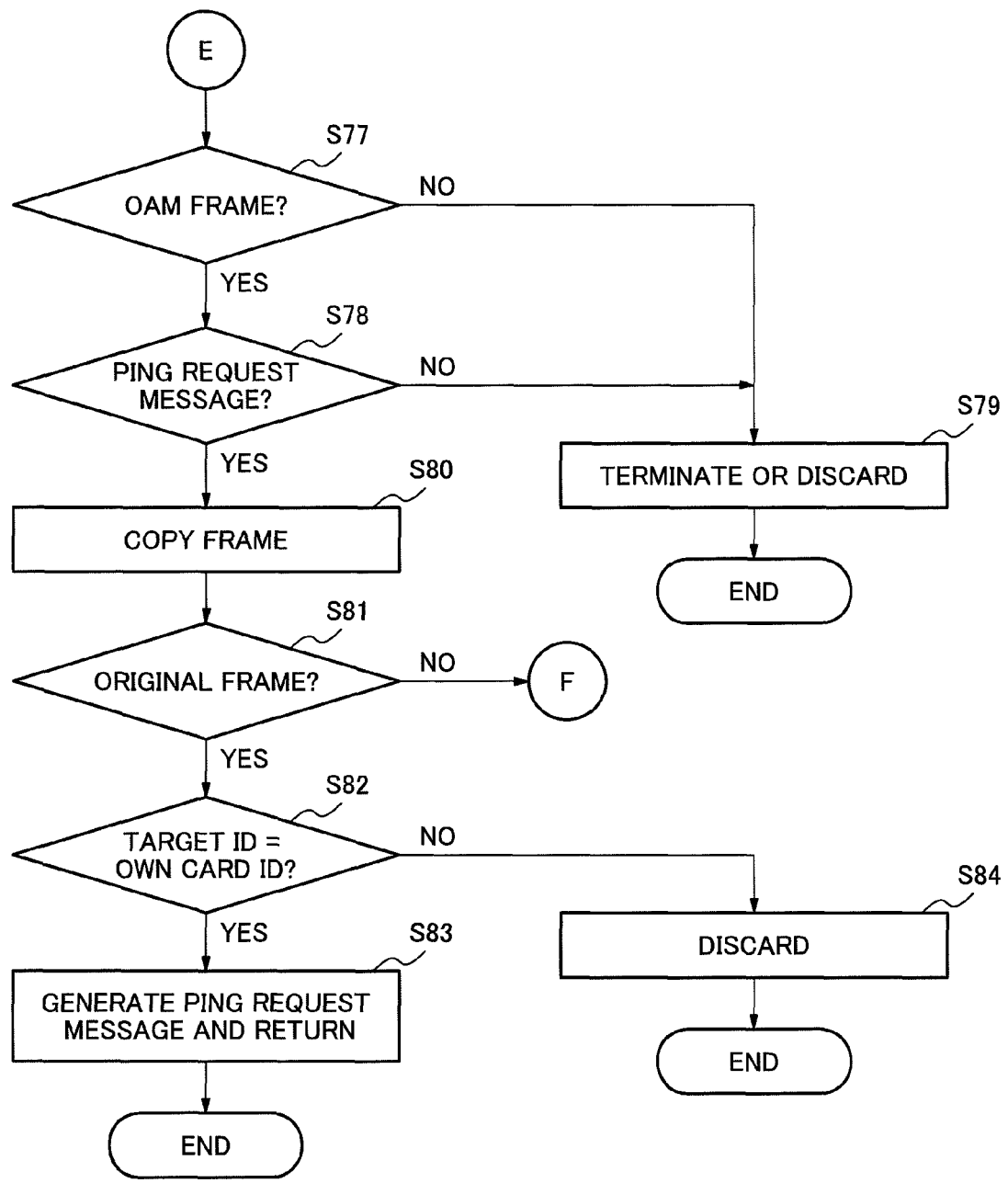
FIG. 20 is a flow chart showing operation of the label transfer device according to the fourth embodiment of the present invention.
Figure 21:
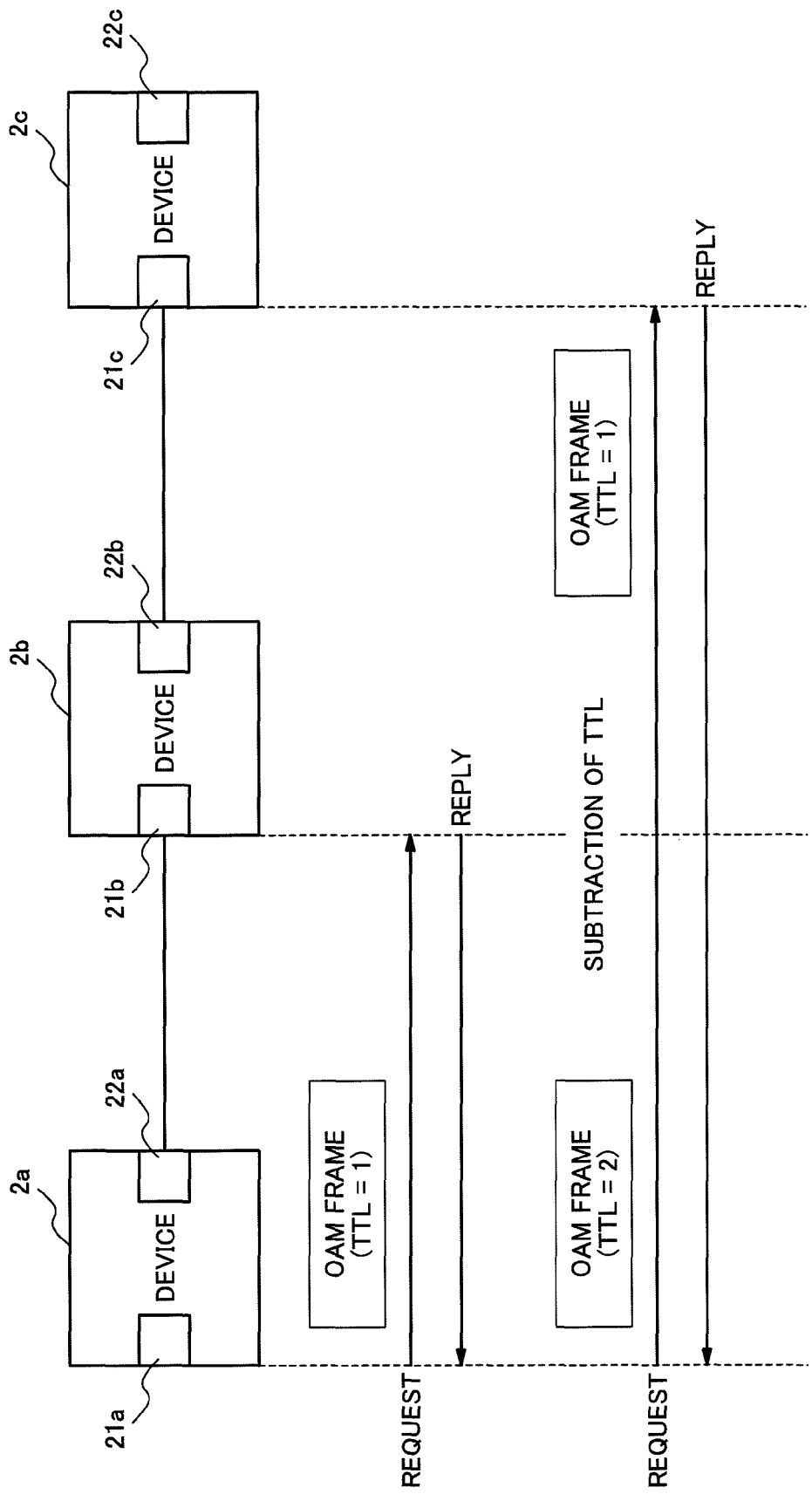
FIG. 21 is a figure showing an outline of LSP-Ping/LSP-Trace related to the present invention.
Figure 22:
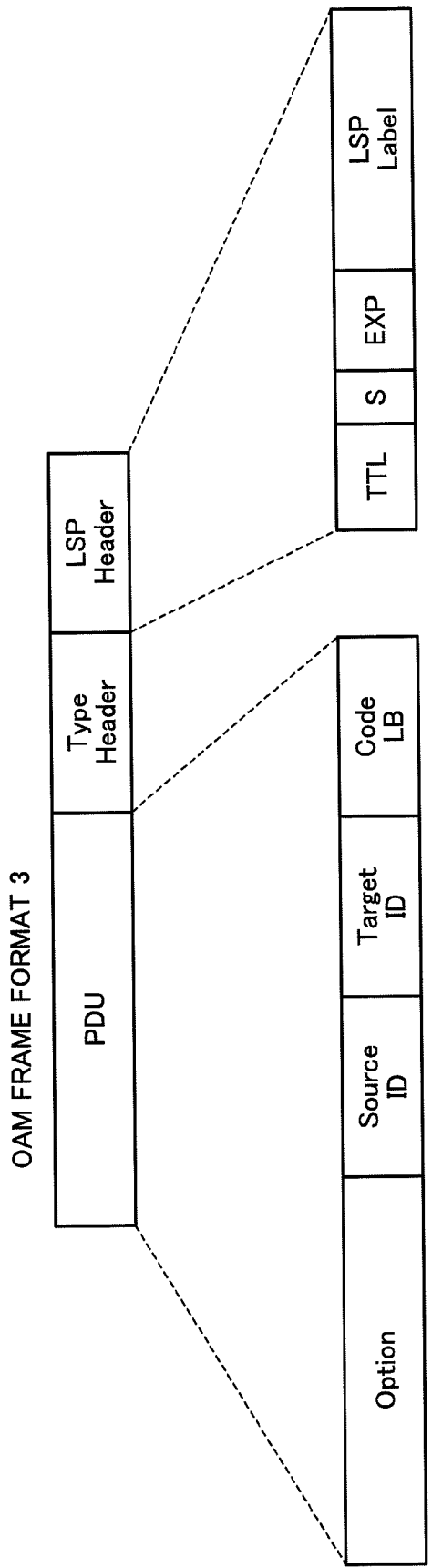
FIG. 22 is a figure showing a format of an MPLS frame.

FIG. 19 and FIG. 20 are flow charts showing operation of the label transfer device according to the fourth embodiment of the present invention. Further, processing operation shown in FIG. 19 and FIG. 20 is realized by a CPU (central processing unit) (not shown) in the label transfer device executing a software program stored in a memory and so on (not shown) or a hardware program such as an FPGA (Field Programmable Gate Array).

Hereinafter, operation of the label transfer device according to the fourth embodiment of the present invention will be described with reference to FIG. 19 and FIG. 20. Also, because operation of the component in this embodiment identical with that in the third embodiment of the present invention is the same operation as the label transfer device according to the third embodiment of the present invention mentioned above, the operation description of the identical component (operation of the port 111 of the input line card 16, the OAM processing unit 114, the transfer unit 115 and the output line card 12) will be omitted, and only the operation of the TTL processing unit 116 of the input line card 16 which is a different component will be described.

The TTL processing unit 116 detects TTL of an LSP label of a received frame (FIG. 19, steps S71 and S72), extracts a frame of TTL=1 or including a specific label (YES in FIG. 19, step S73) and performs OAM determination. On the contrary, for other normal frame, it performs subtraction of TTL, transfers it to the transfer unit 115 and processes it (FIG. 19, steps S74-S76).

In case the received frame is not an OAM frame (NO in FIG. 20, step S77), the TTL processing unit 116 terminates the received frame or discards it (FIG. 20, step S79). On the contrary, in case the received frame is an OAM frame (YES in FIG. 20, step S77), the TTL processing unit 116 further identifies an OAM type.

As a result, in case the received frame is not a Ping message (NO in FIG. 20, step S78), the TTL processing unit 116 performs other termination or discards it (FIG. 20, step S79). On the contrary, in case the OAM frame is a Ping message (YES in FIG. 20, step S78), the TTL processing unit 116 copies the OAM frame (NO in FIG. 20, steps S80 and S81), transfers it to the transfer unit 115 and processes it (FIG. 19, step S74-Step S76). The original frame is (YES in FIG. 20, step S81) transferred to the OAM processing unit 114, and processed (FIG. 20, step S82-Step S84).

As stated above, the label transfer device according to this embodiment includes in the label transfer device including the input unit and the output unit: the TTL processing unit 116 in the input unit which detects TTL and a type of the received frame, and in case of an OAM frame of TTL=1 and a Ping message, terminates the OAM frame, and in addition, by setting an abnormal value to TTL of the OAM frame, transfers it to the output unit; and only the corresponding output line card 12 performs OAM answer. With the above structure, the label transfer device can process the OAM frame within the output line card 12, and in addition, decrease delay in the input line card 16 and grasp a status of the output line card 12 at high speed.

In the embodiment mentioned above, it is configured such that the input line card sets TTL of an LSP label which is stored in the OAM frame received from outside to a specific value (0, for example) and transfers it to the output line card, and the output line card can terminate the OAM frame based on the value of TTL. According to the fifth embodiment and the sixth embodiment stated below, a case will be described in which, instead of TTL of an LSP label, a value stored in a field other than TTL of an LSP label included in an OAM frame is used. Further, in the embodiments below, because structures of the label transfer device are almost the same as that of the third embodiment, a detailed description of each structure and operation will be omitted. In the embodiments below, by using FIG. 13 as needed, description will be made focusing on a setting method of a value stored in a field other than TTL of an LSP label included in an OAM frame.

First, the fifth embodiment will be described. In this embodiment, operation will be described in case an OAM frame or a message for internal use in the embodiment mentioned above (hereinafter, OAM frame) uses GAL shown in FIG. 9.

In case an OAM frame uses GAL, as a judgment standard whether the output line card 12 terminates the OAM frame, it can be considered to use, instead of TTL of an LSP label, for example, TTL or TC in GAL shown in FIG. 9.

First, a case will be described in which, instead of TTL of an LSP label, TTL in GAL is used. When the port 111 of the input line card 16 receives an OAM frame, usually, a TTL value of GAL is 1. Using this, in case it is judged by the TTL processing unit 113 that TTL of an LSP label is 1 and the OAM frame is addressed to its own node, the TTL processing unit 113 sets the TTL value of GAL to a specific value and transmits it to the output line card 12. As a specific value, for example, it is possible that the TTL value of GAL is set to 2. Next, based on the TTL value of GAL, the output line card 12 terminates the OAM frame.

In case when TC in GAL is used, also similarly, the TTL processing unit 113 may change a TC value of GAL to a specific value. Specifically, to make a normal value of TC of GAL as 0, and a specific value as 1, can be considered as an example.

As stated above, according to the fifth exemplary embodiment, same as the exemplary embodiment mentioned above, an OAM frame can be processed within the output line card. As a result, it becomes possible to monitor a trouble status of the output line card.

Next, the sixth exemplary embodiment will be described. Whereas the output line card judged based on TTL of an LSP label whether to terminate an OAM frame according to the first exemplary embodiment and so on, the output line card 12 judges whether to terminate the OAM frame based on each of a specific value of TTL of an LSP label and a field other than TTL of an LSP label included in an OAM frame according to this embodiment. Here, it is supposed that a transmission source of an OAM frame selects which field other than TTL of an LSP label to use and decides a specific value in advance.

First, in case the port 111 of the input line card 16 receives an OAM frame, when TTL of an LSP label is 1, the TTL processing unit 113 judges that the received OAM frame is addressed to its own node same as the fifth embodiment and so on. After that, the TTL processing unit 113 transmits the received OAM frame to the output line card 12. In other words, the input line card 16, without changing in particular a value stored in the OAM frame as a general rule, transmits it to the output line card 12.

Next, the TTL identification unit 121 of the output line card 12 receives the OAM frame which the input line card 16 transmitted. Here, the TTL identification unit 121 of the output line card judges, by using a value in a field other than TTL of an LSP label in addition to a TTL value of the LSP label which shows that a termination destination of the OAM frame is the node itself, whether to terminate the received OAM frame. At that time, TTL of the LSP label which shows that a termination destination of the OAM frame is the node itself can be made a value set in advance. For example, a value set in advance may be 1, or as indicated in the first embodiment, may be a specific value set by the OAM processing unit 114. As an example of the specific value, 0 can be mentioned.

As a field other than TTL of an LSP label, either of fields other than the LSP label (FIG. 9: "LSP Label") in a frame format of FIG. 9 can be used. For example, it can be considered to use a field in GAL, ACH or ACH TLV. More specifically, it can be considered to set a specific value in a field of Channel Type of ACH, Type of ACH TLV, Value of ACH TLV or TTL of GAL. However, the LSP label cannot be used, because it is required for a transfer of an OAM frame. Therefore, it is enough that a value which shows that the OAM frame is terminated in the output line card 12 may be included in either of the fields mentioned above and, as a general rule, other than the LSP label.

In this way, the TTL identification unit 121 of the output line card 12 judges whether to terminate the received OAM frame based on TTL of GAL, ACH Channel Type, or Type or Value of ACH TLV. Because OAM frame termination processing and so on after that is the same as that of the other exemplary embodiments, the description will be omitted here.

As stated above, according to the sixth exemplary embodiment, same as the exemplary embodiment mentioned above, because a trouble status of the output line card can be monitored, an OAM frame can be processed within the output line card. Also, by deciding to which field a transmission source of an OAM frame refers in advance, it becomes unnecessary within the input line card to perform processing which is performed within the first exemplary embodiment to the fifth exemplary embodiment and so on. Accordingly, the effect of reducing processing addition in the input line card can be obtained according to the sixth exemplary embodiment.

Also, in the fifth exemplary embodiment and the sixth exemplary embodiment mentioned above, a method can also be considered which, not using TTL or a TC value of GAL, or each field of ACH, installs a special label in the OAM frame newly. It can be considered to install the special label, for example, in a GAL field of GAL. When an OAM frame or a message for internal use which includes this special label is received, the output line card 12 extracts the OAM frame or the message for internal use including the special label and performs termination processing.

In the first exemplary embodiment, in case an OAM frame of TTL=1 is received, the input unit (input line card) of the label transfer device sets TTL of the OAM frame to a specific value (0, for example), and transmits it to the output unit (output line card). Next, the output unit terminates the OAM frame including the specific value in TTL.

In the technology disclosed by non-patent literature 1, subtraction is performed to TTL each time it reaches a repeating device, and a repeating device which received an OAM frame whose TTL is 1 terminated the OAM frame. In this case, it can be said that TTL is used in order to decide a node which becomes a termination destination of an OAM frame.

On the other hand, according to the embodiment of the present invention, it can be said that a value stored in the field as TTL which is being used in order to decide a node which becomes a termination destination of an OAM frame in non-patent literature 1 is used by the output unit as a flag to terminate the OAM frame.

Also, in the technology disclosed by non-patent literature 1, when an OAM frame reaches a repeating device which is a termination destination, it is terminated at the input unit in the repeating device. For this reason, an OAM frame is not processed in the output unit, and there was a problem that a trouble status of the output line card cannot be monitored.

In contrast, according to the embodiment of the present invention, by using TTL in a completely different method than a conventional way how TTL is used, the problem mentioned above can be solved. Specifically, by the input unit setting TTL to a specific value (TTL=0, for example) and transmitting an OAM frame to the output unit, the output unit can terminate an OAM frame including the specific value in TTL. As a result, it becomes possible for the output unit to process an OAM frame, and because of this, a trouble status of the output line card can be monitored.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-253569 filed on Nov. 5, 2009, and Japanese patent application No. 2010-139696 filed on Jun. 18, 2010, the disclosures of which are incorporated herein in its entirety by reference.

REFERENCE SIGNS LIST 1a, 1b, 1c Device
11, 11a, 11b, 11c, 14, 16 Input line card
12, 12a, 12b, 12c, 15 Output line card
13 Switch fabric
111 Port
112 Label identification unit
113, 116 TTL processing unit
114 OAM processing unit
115 Transfer unit
121 TTL processing unit
122 OAM processing unit
123 Port
141 Message for internal use processing unit
151 Message for internal use processing unit
1141 Ping processing unit
1161 Ping identification unit

The invention claimed is:

1. A node in an MPLS (Multi Protocol Label Switching) network, comprising:
an input unit which receives an OAM (Operation Administration and Maintenance) frame including TTL (Time To Live) from outside of the node; and
an output unit which transmits an OAM frame to another node connected outside of the node, wherein:
said input unit sets said TTL to a specific value and transmits said received OAM frame to said output unit in case where said node is destination of said received OAM frame; and
said output unit terminates an OAM frame transmitted from said input unit.

2. The node according to claim 1, wherein said output unit further comprises a processing unit which judges a value of TTL of all MPLS frame transmitted in order to judge whether to terminate said OAM frame transmitted.

3. The node according to claim 1, wherein said OAM frame further comprises a field which indicates a termination destination in the node; and said output unit terminates said OAM frame transmitted, and in case said field which indicates a termination destination in the node included in the terminated OAM frame indicates said output unit, notifies a transmission source of said OAM frame received from outside regarding reception of said transmitted OAM frame by the output unit.

4. The node according to claim 3, wherein in case a termination destination indicated by said field which indicates a termination destination in the node included in said received OAM frame is different from said input unit, said input unit transmits said received OAM frame to said output unit.

5. The node according to claim 4, wherein in case said field which indicates a termination destination in the node included in said received OAM frame indicates said input unit, said input unit notifies a transmission source which transmitted said received OAM frame that said input unit received said OAM frame.

6. The node according to claim 4, wherein in case said termination destination indicated by said field which indicates said termination destination is said output unit, said input unit transmits said received OAM frame to said output unit.

7. The node according to claim 3, wherein said input unit processing the payload of said received OAM frame after copying said received OAM frame and transmitting said received OAM frame that includes said TTL with said specific value to said output unit.

8. The node according to claim 1, wherein said specific value is 0.

9. The node according to claim 1, wherein a termination destination which said OAM frame indicates is a termination destination which is indicated by said TTL.

10. The node according to claim 1, wherein a termination destination which is indicated by said TTL is a node which received an OAM frame where said TTL is 1.

11. The node according to claim 1, wherein a termination destination which said OAM frame indicates is a termination destination indicated by a field which indicates an end of a path of said OAM frame included in said OAM frame.

12. The node according to claim 3, wherein in case said field which indicates a termination destination in the node stored in said OAM frame transmitted indicates a termination destination different from said output unit, said output unit notifies a transmission source which transmitted said received OAM frame that a termination destination indicated by said field which indicates a termination destination in the node is different from said output unit.

13. The node according to claim 3, wherein said field which indicates a termination destination in the node is either of: TC (Traffic Class) of GAL (Generic Associated channel Label) of an OAM frame; Channel Type of ACH (Associated Channel Header) of an OAM frame; Reserved of ACH of an OAM frame; or TLV (Target/Length/Value) of ACH.

14. The node according to claim 3, wherein said input unit, in case said OAM frame is a Ping message, and in case a termination destination indicated by said field which indicates a termination destination in the node of said Ping message is the node itself, generates a second Ping message which shows that said input unit received it said Ping message and transmits said Ping message to a transmission source; and in case it is different, discards said Ping message; and said output unit, in case a terminated OAM frame is said Ping message, and in case a termination destination indicated by said field which indicates a termination destination in the node of said Ping message is the node itself, transmits a third Ping message which shows that said input unit received said Ping message and transmits said Ping message to a transmission source of said OAM frame received from outside; and in case it is different, discards said Ping message.

15. The node according to claim 1, wherein said MPLS is MPLS-TP (Multi Protocol Label Switching Transport Profile).

16. A node which transmits and receives an OAM (Operation Administration and Maintenance) frame including TTL (Time To Live), comprising:

an input unit which receives an OAM frame from outside of a device; and an output unit which transmits an OAM frame to another device connected outside of a said device, wherein said input unit sets TTL of an OAM frame received from outside to a specific value which shows that a termination destination is said output unit and transmits said received OAM frame to said output unit; and said output unit detects a value of TTL of an OAM frame received from said input unit and terminates an OAM frame including TTL of said specific value.

17. A monitoring management method which is used for a node in an MPLS (Multi Protocol Label Switching) network, wherein said node comprises an input unit which receives an OAM (Operation Administration and Maintenance) frame including TTL (Time To Live) from outside of the node and an output unit which transmits an OAM frame to another device connected outside of the node, said method comprising:

setting said TTL to a specific value and transmitting said received OAM frame to said output unit in said input unit, in case where said node is destination of said received OAM frame; and terminating an OAM frame transmitted from said input unit in said output unit.

18. The monitoring management method according to claim 17, wherein said output unit judges TTL of all MPLS frame transmitted in order to judge whether to terminate said OAM frame transmitted.

19. The monitoring management method according to claim 17, wherein said OAM frame further comprises a field which indicates a termination destination in the node; and said output unit terminates said OAM frame transmitted, and in case said field which indicates a termination destination in the node included in the terminated OAM frame indicates said output unit, notifies a transmission source of said OAM frame received from outside regarding reception of said transmitted OAM frame by said output unit.

20. A transfer system including a plurality of nodes in an MPLS (Multi Protocol Label Switching) network, an output unit of one of said plurality of nodes and an input unit of another of said plurality of nodes being connected, each of said plurality of nodes comprising:

said input unit which receives an OAM (Operation Administration and Maintenance) frame including TTL (Time To Live) from outside of the node; and said output unit which transmits an OAM frame to another node from among the plurality of nodes connected outside of the node, wherein said input unit, in case where said node is destination of the received OAM frame, sets said TTL to a specific value and transmits said received OAM frame to said output unit; and said output unit terminates an OAM frame transmitted from said input unit.

21. An input circuit which is installed in a node used for an MPLS (Multi Protocol Label Switching) network, wherein said circuit receives an OAM (Operation Administration and Maintenance) frame including TTL (Time To Live) from outside of the node, and wherein in case where said node is destination of said received OAM frame, said circuit sets said TTL to a specific value and transmits an OAM frame to said output unit.

22. An output circuit which is installed in a node used for an MPLS (Multi Protocol Label Switching) network, wherein in case an input unit receives an OAM (Operation Administration and Maintenance) frame including TTL (Time To Live) from outside of the node, and in case where said node is destination of the received OAM frame, said circuit terminates an OAM frame transmitted from said input unit.

23. A node in an MPLS (Multi Protocol Label Switching) network, comprising:

input means for receiving an OAM (Operation Administration and Maintenance) frame including TTL (Time To Live) from outside of the node; and output means for transmitting an OAM frame to outside of the node, wherein:

said input means sets said TTL to a specific value and transmits said received OAM frame to said output means in case where said node is destination of said received OAM frame; and said output means terminates an OAM frame transmitted from said input means.

24. A node which transmits and receives an OAM (Operation Administration and Maintenance) frame including TTL (Time To Live), comprising:
- input means for receiving an OAM frame from outside of a device; and
- output means for transmitting an OAM frame to outside of a device, wherein
- said input means sets TTL of an OAM frame received from outside to a specific value which shows that a termination destination is said output means and transmits said received OAM frame to said output means; and
- said output means detects a value of TTL of an OAM frame received from said input means and terminates an OAM frame including TTL of said specific value.

25. A transfer system including a plurality of nodes in an MPLS (Multi Protocol Label Switching) network, an output unit of one of said plurality of nodes and an input unit another of said plurality of nodes being connected, each of said plurality of nodes comprising:
- said input means for receiving an OAM (Operation Administration and Maintenance) frame including TTL (Time To Live) from outside of the node; and
- said output means for transmitting an OAM frame to another node from among the plurality of nodes connected outside of the node, wherein
- said input means, in case where said node is destination of said received OAM frame, sets said TTL to a specific value and transmits said received OAM frame to said output means; and
- said output means terminates an OAM frame transmitted from said input means.

* * * * *